(12) United States Patent
Dundovic et al.

(10) Patent No.: US 12,465,272 B2
(45) Date of Patent: Nov. 11, 2025

(54) VAGUS NERVE STIMULATION SYSTEM

(71) Applicant: PARASYM LTD, London (GB)

(72) Inventors: Nathan Dundovic, Milton (AU);
Sophie Dundovic, Milton (AU)

(73) Assignee: PARASYM LTD, London (GB)

(*) Notice: Subject to any disclaimer, the term of this patent is extended or adjusted under 35 U.S.C. 154(b) by 0 days.

(21) Appl. No.: 18/535,628

(22) Filed: Dec. 11, 2023

(65) Prior Publication Data

US 2024/0108273 A1    Apr. 4, 2024

Related U.S. Application Data

(63) Continuation of application No. 17/634,954, filed as application No. PCT/AU2020/050838 on Aug. 12, 2020.

(30) Foreign Application Priority Data

Aug. 13, 2019  (AU) ................................ 2019902913

(51) Int. Cl.
*A61B 5/375*    (2021.01)
*A61B 5/00*     (2006.01)
(Continued)

(52) U.S. Cl.
CPC .......... *A61B 5/375* (2021.01); *A61B 5/02438* (2013.01); *A61B 5/1495* (2013.01);
(Continued)

(58) Field of Classification Search
CPC ........................... A61N 1/0456; A61N 1/36036
See application file for complete search history.

(56) References Cited

U.S. PATENT DOCUMENTS 8,457,765 B2    6/2013  Kirsch et al.
9,763,590 B1    9/2017  Rood et al.
(Continued)

FOREIGN PATENT DOCUMENTS

AU    2016 385 453 A1    7/2018
AU    2016 385 453 B2    9/2019
(Continued)

OTHER PUBLICATIONS

Cooper, et al., "Heart rate variability predicts levels of inflammatory markers: Evidence for the vagal anti-inflammatory pathway", Brain, Behavior, and Immunity, vol. 49, pp. 94-100, 2015.
(Continued)

*Primary Examiner* — George R Evanisko
(74) *Attorney, Agent, or Firm* — Baker Hostetler

(57) ABSTRACT

A vagus nerve stimulation system for stimulating a vagus nerve in a biological subject, the system including a clip configured to be attached to a tragus of the subject, the clip including opposing arms configured so that a distal end of the arms are biased towards each other and electrodes positioned proximate a distal end of the arms on opposing faces so that the electrodes are urged into engagement with opposing faces of the tragus and a signal generator electrically connected to the electrodes, the signal generator being configured to generate at least one therapy signal that is applied to the vagus nerve within the tragus via the electrodes, to thereby modulate the vagus nerve.

24 Claims, 19 Drawing Sheets

(51) Int. Cl.

| | | |
|---|---|---|
| *A61B 5/024* | (2006.01) | |
| *A61B 5/1495* | (2006.01) | |
| *A61N 1/04* | (2006.01) | |
| A61B 5/01 | (2006.01) | |
| A61B 5/0533 | (2021.01) | |
| A61B 5/1455 | (2006.01) | |

(52) U.S. Cl.
CPC ............ *A61B 5/4836* (2013.01); *A61B 5/486* (2013.01); *A61B 5/6803* (2013.01); *A61B 5/6838* (2013.01); *A61N 1/0456* (2013.01); A61B 5/01 (2013.01); A61B 5/02405 (2013.01); A61B 5/0533 (2013.01); A61B 5/14551 (2013.01); A61B 5/681 (2013.01); A61B 5/7275 (2013.01); A61B 5/7455 (2013.01)

(56) References Cited

U.S. PATENT DOCUMENTS

| | | | |
|---|---|---|---|
| 10,130,809 | B2 | 11/2018 | Cartledge et al. |
| 10,695,568 | B1* | 6/2020 | Covalin .............. A61H 39/002 |
| 10,820,821 | B1 | 11/2020 | Rood et al. |
| 2005/0165460 | A1 | 7/2005 | Erfan |
| 2007/0250145 | A1 | 10/2007 | Kraus et al. |
| 2017/0087364 | A1* | 3/2017 | Cartledge ................ A61N 1/18 |
| 2018/0021564 | A1 | 1/2018 | Goodall et al. |
| 2018/0132717 | A1* | 5/2018 | Batzer .................. A61B 5/6823 |
| 2020/0338348 | A1* | 10/2020 | Honeycutt ......... A61B 5/14542 |

FOREIGN PATENT DOCUMENTS

| | | |
|---|---|---|
| WO | WO 2012/168543 A1 | 12/2012 |
| WO | WO 2017/120023 A2 | 7/2017 |
| WO | WO 2018/050773 A1 | 3/2018 |
| WO | 2022/153321 A1 | 7/2022 |

OTHER PUBLICATIONS

Stavrakis, et al., "TREAT AF (Transcutaneous Electrical Vagus Nerve Stimulation to Suppress Atrial Fibrillation)", JACC Clinical Electrophysiology, vol. 6, No. 3, pp. 282-291, 2020.

Stavrakis, et al., "Low-level transcutaneous electrical vagus nerve stimulation suppresses atrial fibrillation", Journal of the American College of Cardiology, 65(9), pp. 867-875, 2015.

Tran, et al., "Autonomic neuromodulation acutely ameliorates left ventricular strain in humans", Journal of Cardiovascular Translational Research, 12(3), pp. 221-230, 2019.

Stavrakis, et al., "Low-level vagus nerve stimulation suppresses post-operative atrial fibrillation and inflammation", JACC: Clinical Electrophysiology, 3(9), pp. 929-938, 2017.

Dasari, et al., "Non-invasive Neuromodulation of Vagus Activity Improves Endothelial Function in Patients with Heart Failure with Reduced Ejection Fraction", Journal of Cardiac Failure, 24(8), S59-S60, 2018.

Stavrakis, et al., "Low level transcutaneous vagus nerve stimulation acutely ameliorates diastolic function in humans", European Heart Journal, vol. 38, p. 2437, 2017.

Noe, et al., "Feasibility, safety and efficacy of transauricular vagus nerve stimulation in a cohort of patients with disorders of consciousness", Brain Stimulation, vol. 13, pp. 427-429, 2020.

Sun, et al., "Vagus nerve stimulation improves working memory performance", Journal of Clinical and Experimental Neuropsychology, 2017.

Lindley, "Effect of Transcutaneous Vagus Nerve Stimulation on Sports Performance", Arizona State University, 2019.

Fudim, et al., "Implications for Neuromodulation Therapy to Control Inflammation and Related Organ Dysfunction in COVID-19", Journal of Cardiovascular Translational Research, vol. 13, pp. 894-899, 2020.

Staats, et al., "The Use of Non-invasive Vagus Nerve Stimulation to Treat Respiratory Symptoms Associated With COVID-19: A Theoretical Hypothesis and Early Clinical Experience", Neuromodulation: Technology at the Neural Interface, pp. 784-788, 2020.

Vanelzakker, et al., "Chronic fatigue syndrome from vagus nerve infection: A psychoneuroimmunological hypothesis", Medical Hypotheses, vol. 81, pp. 414-423, 2013.

Gurel, et al., "Transcutaneous cervical vagal nerve stimulation reduces sympathetic responses to stress in posttraumatic stress disorder: A double-blind, randomized, sham controlled trial", Neurobiology of Stress, vol. 13, 100264, 2020.

Yu, et al., "Low-Level Tragus Stimulation for the Treatment of Ischemia and Reperfusion Injury in Patients With ST-Segment Elevation Myocardial Infarction", JACC. Cardiovascular interventions, vol. 10(15), pp. 1511-1520, 2017.

\* cited by examiner

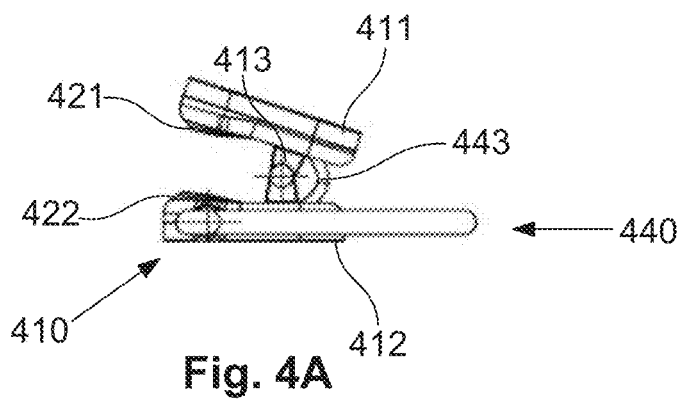
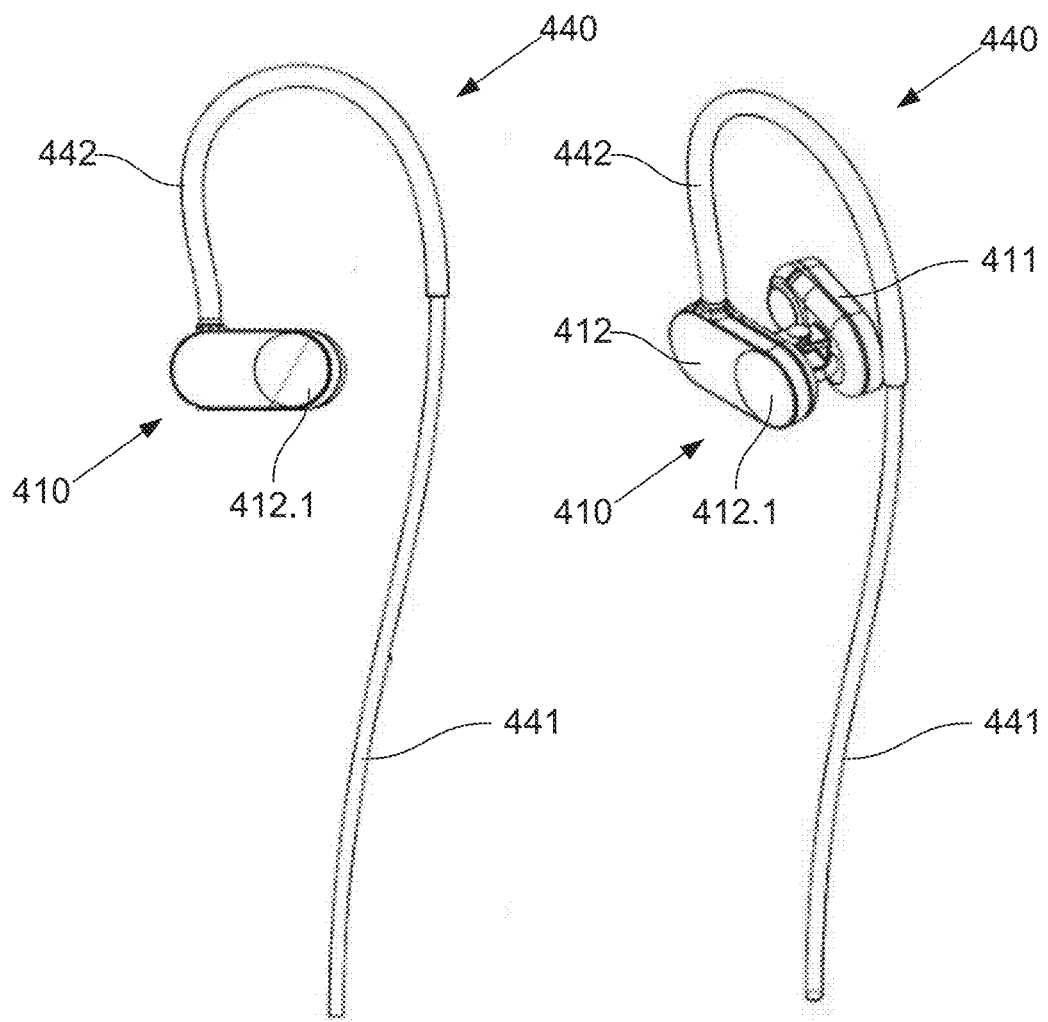
Fig. 4A
Fig. 4B  Fig. 4C

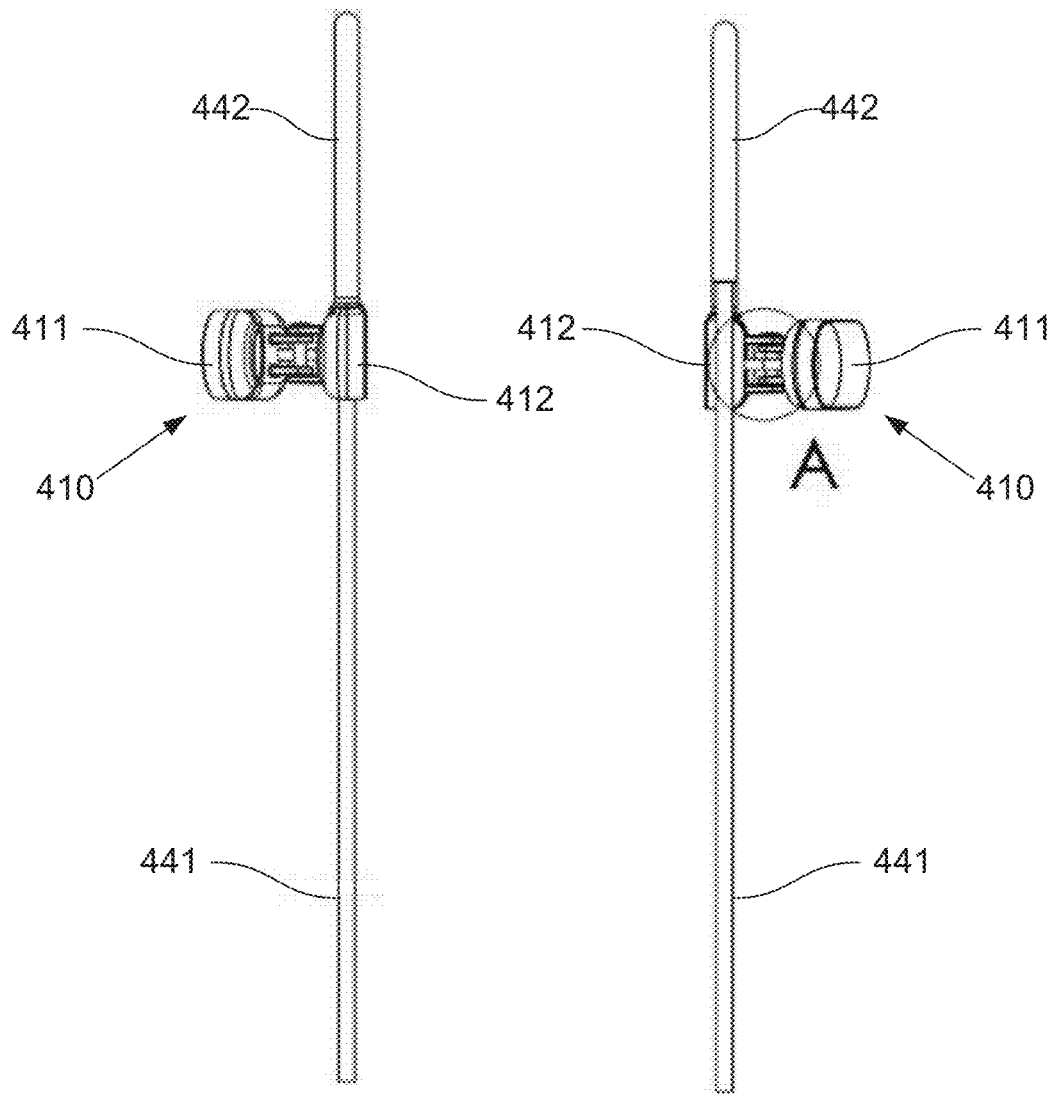
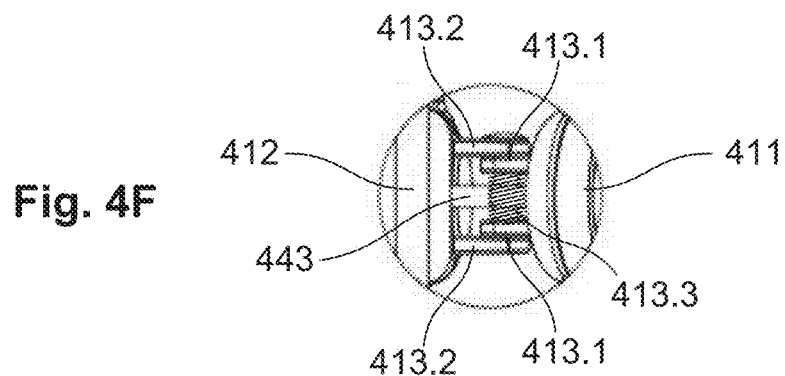
Fig. 4D  Fig. 4E
Fig. 4F

VAGUS NERVE STIMULATION SYSTEM

CROSS-REFERENCE TO RELATED APPLICATIONS

This application is a continuation of U.S. patent application Ser. No. 17/634,954, filed Feb. 11, 2022, which claims the benefit under 35 U.S.C. § 371 to International Application No. PCT/AU2020/050838, filed on Aug. 12, 2020, which claims priority to Australian Patent Application No. AU 2019902913, filed Aug. 13, 2019. The entire contents of each preceding patent application are hereby incorporated herein by reference.

FIELD OF THE INVENTION

The present invention relates to a nerve stimulation system and in one particular example, to a non-invasive vagus nerve stimulation system for stimulating the vagus nerve.

BACKGROUND OF THE INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

The vagus nerve is made up of an intricate neural network that maintains homeostasis and equilibrium in important processes. Reciprocal neural connections with several brain areas serve as a control centre that responds to new information (stimulus) with appropriate adaptive feedback for modulation. The vagus nerve has four vagal nuclei that provide key controls to the cardiovascular, respiratory, and alimentary systems with respective neurotransmitters. It is tenth of twelve cranial nerves, being the main nerve interfacing with the parasympathetic division of the autonomic nervous system. Recent clinical studies have revealed that the vagus nerve is also involved in inflammation, mood, and pain regulation, all of which can be potentially modulated by stimulating the vagus nerve with micropulses of electrical current, known as Vagus Nerve Stimulation (VNS).

The development of vagus nerve stimulation (VNS) as therapy began with the investigations of James Corning who developed the first basic functioning VNS device. In the late 1990's, after the success of several clinical trials illustrating the beneficial use of VNS for treatment resistant epilepsy and depression, the FDA approved its use for these applications. This illustrated the safe and effective use of this treatment modality.

Stimulation of the vagus nerve utilises several modulatory actions in the nervous, immune, autonomic, endocrine, cardiorespiratory, and gastrointestinal systems. The exact mechanisms of action in VNS are still being theorised however this has not hindered its ability to demonstrate safe and effective use for individuals suffering from conditions which interface vagal pathways. For example, vagus nerve stimulation therapies have already been approved by regulatory bodies for applications such as mood enhancement, pain relief, improving sleep and reducing anxiety; with investigations underway in assessing the cardiac and inflammatory modulation properties as well as those utilising effects of neuroplasticity.

In this regard, the vagus nerve is the main nerve of the parasympathetic division of the autonomic nervous system, which regulates unconscious processes in the body. The Parasympathetic Nervous System (PNS) is often referred to as the 'rest and digest' system, whereas the Sympathetic Nervous System (SNS) is thought of as the 'fight or flight' system. Stimulation of the vagus nerve has been shown to increase PNS activity/decrease SNS activity. Further through this regulation of metabolic homeostasis, the vagus nerve also controls heart rate, where increasing vagal activity has been associated with decreases in heart rate. This is significant because autonomic dysfunction, as characterised by an overactive SNS response, is thought to underpin serval high impact chronic conditions, illustrating the value of an intervention which can modulate this.

Neurotransmitters are chemical substances released by nerve fiber impulses to surrounding areas of this electrical activity. Examples of neurotransmitters include Serotonin, Noradrenaline/Norepinephrine and Gamma-Aminobutyric acid (GABA). Research in this area indicates stimulating the vagus nerve can influence the release of neurotransmitters in the brain. Clinical studies indicate that VNS likely results in changes in serotonin, norepinephrine, GABA, and glutamate, these are all neurotransmitters implicated in the pathogenesis of major depression. This influence on neurotransmitters, along with a number of other theorised mechanisms, is thought to explain the mood enhancing effects arising from stimulation of the vagus nerve.

It is now understood that the nervous system reflexively regulates the inflammatory response in real time, in much the same way that it controls heart rate and other vital functions. This is thought to occur via the vagus nerve through a neural reflex mechanism known as the 'inflammatory reflex'. The brain receives signals from the immune system for the purposes of optimally controlling inflammation in the body, however, dysfunction in these signals can lead to excess inflammation. It has been observed that without vagus nerve activity (either due to a vagotomy or neural lesions) there is an absence of the inflammatory reflex which can result in excessive innate immune responses and cytokine toxicity (excessive inflammation). This led to clinical study and demonstration that stimulation of the vagus nerve can lead to decreases in inflammatory cytokines. The anti-inflammatory properties of (stimulating) the vagus nerve are thought to be through the Cholinergic Anti-inflammatory Pathway (CAP) as well as mediated through the Hypothalamic pituitary adrenal (HPA) axis. These insights have led to new opportunities in the treatment of inflammation through these selective and reversible 'hard-wired' neural systems.

Research towards the end of the 20th century has shown that many aspects of the brain can be altered, or are 'plastic', even through adulthood. Neuroplasticity is the brain's ability to restructure itself by generating new neural connections. It allows the neurons or nerve cells in the brain to compensate for injury or disease and amend their processes in response to new situations or environmental changes. The promotion of neuroplastic effects from VNS through alterations in central nervous system neurotransmitter levels and/or processing have led to greater focus on the use of VNS as therapy for tinnitus and stroke rehabilitation. It is now theorised that a significant number of Tinnitus cases arise or are disproportionality contributed by maladaptive plasticity of the auditory cortex. These applications utilise the mechanisms of 'targeted plasticity', by stimulating the vagus nerve to promote neuroplasticity and pair this with a specific stimulus, eg. sound therapy (for tinnitus) or rehabilitative exercise (for stroke recovery), which targets this effect of plasticity in the specific region of the brain associated with each condition. This has led to outcomes such as accelerated and improved recovery from stroke and reductions in the symptoms of tinnitus.

Traditionally VNS as a treatment method has been limited by the need for surgical implantation. This ultimately restricted access geographically (centres specialising in the procedure), by condition severity (to warrant surgery), and financially (those who could afford the procedure). More recently a number of non-invasive stimulation devices have been proposed. Specifically, this can be achieved utilising the auricular branch of the vagus nerve which runs past the outer ear, allowing this to be used to provide transcutaneous vagus nerve stimulation (tVNS). This method has now been shown to activate vagal pathways in the same way as with the surgical (VNS) procedure, making it an accessible, low risk and lower cost route to stimulating the vagus nerve.

US20050165460 describes a self-contained, portable headset carries a waveform source device and tissue interface circuits in a self-locating position for delivering treatment signals to a preselected area in the conch of the ear of a human subject. An electronics housing carries a waveform source device in communication with right and left tissue interface circuits, carried respectively in right and left earpiece housings. The headset carries each earpiece housing at a rearward and downward angle so that a protruding trunk enters the conch of the outer ear and contacts the conch generally below and rearwardly of the ear canal. An audio speaker delivers associated tones during treatment. An end wall of the trunk carries an array of electrodes contacts the preselected area in the conch of the ear.

U.S. Ser. No. 10/130,809 describes an electrostimulation device, it includes a computer generating an electrostimulation generator control signal and outputting a music signal, a transcutaneous electrostimulation generator, an electronic signal conduit, and an electrode coupler. The generator receives the generator control signal and the music signal, generates a nerve electrostimulation signal dependent upon the generator control signal, and outputs the nerve electrostimulation signal at the stimulation output and the music signal at an audio output. The coupler fits in an ear canal, has a speaker connected to the audio output to output the music signal into the ear canal when worn, and has electrostimulation electrodes conductively connected to the stimulation output through the electronic signal conduit to receive the nerve electrostimulation signal and positioned to contact tissue within the canal to transcutaneously apply the nerve electrostimulation signal thereto. The coupler supplies the nerve electrostimulation signal while music outputs from the speaker.

U.S. Pat. No. 8,457,765 describes an ear clip electrode used to conduct a minute amount of electricity from a stimulator to the ear lobes of a patient. The ear clip electrode is provided with an inner and outer plastic piece onto which separate metallic plates are placed. Both the metallic plate as well as the plastic pieces are provided with a circular end onto which a metallic pole is placed. Electrode pads are placed upon these metallic poles and electricity is conducted from each of the plates to the electrode pad and then to the patient's ear lobe. A plastic shroud is placed over a substantial length of each of the metallic plates. Plastic material also covers the end surface of each of the metallic poles. The ear clip electrode is connected to a source of minute electrical energy.

US20070250145 describes a device (1) for transcutaneous stimulation of a nerve of the human body, which device (1) comprises at least one stimulation electrode (2) and at least one reference electrode (3) for transcutaneous nerve stimulation, the at least one stimulation electrode (2) and the at least one reference electrode (3) being connected to a control unit (4) and being able to be supplied with an electrical current from the latter, and the at least one stimulation electrode (2) and the at least one reference electrode (3) being arranged in or on a housing (5) which is designed to be fitted on or in the human ear. To make the nerve stimulation effective and to make it easier to manage for the patient, it is proposed, according to the invention, that the housing (5) has a bow-shaped extension piece (6) designed to be inserted into the auditory canal, said bow-shaped extension piece (6) matching the shape of the entrance to the auditory canal or of the external auditory canal, and with an electrode head (7) which is arranged at the end of the bow-shaped extension piece (6) and which has two contact points (8, 9) for the two electrodes (2, 3).

US20180021564 describes a nerve stimulation system including a headset and an earpiece which includes two or more ear-contacting elements, for example an ear canal insert, and a concha insert. Ear-contacting elements may be mounted onto an earpiece housing and have projecting mounting structures, which provide mechanical and electrical connection between ear-contacting elements and housing through various materials and configurations. In an embodiment, a nerve stimulation system includes a neural stimulation subsystem including neural stimulation device control circuitry for use in combination with a personal computing device to control a neural stimulation device.

However, these typically require devices that electrically interface with internal and/or external surfaces of the concha, which can be uncomfortable for users, and difficult to achieve a device that remains in situ during use. Furthermore, the systems suffer from issues associated with safety, efficacy and usability. For example, some electrode configurations and current densities can give rise to skin burns, whilst others fail to achieve effective neurostimulation.

SUMMARY OF THE PRESENT INVENTION

In one broad form, an aspect of the present invention seeks to provide a vagus nerve stimulation system for stimulating a vagus nerve in a biological subject, the system including: a clip configured to be attached to a tragus of the subject, the clip including: opposing arms configured so that a distal end of the arms are biased towards each other; and, electrodes positioned proximate a distal end of the arms on opposing faces so that the electrodes are urged into engagement with opposing faces of the tragus; and, a signal generator electrically connected to the electrodes, the signal generator being configured to generate at least one therapy signal that is applied to the vagus nerve within the tragus via the electrodes, to thereby modulate the vagus nerve.

In one embodiment the system includes a hook extending over and behind an ear of the subject to at least partially support the clip.

In one embodiment the hook is configured to extend laterally from the clip so that the lead can loop over and behind an ear of the subject.

In one embodiment the system includes a lead extending from the clip, the lead including connections configured to electrically connect the electrodes to the signal generator.

In one embodiment the lead is configured to extend laterally from the clip so that the lead can loop over and behind an ear of the subject.

In one embodiment the lead is configured to extend from a distal end of one of the arms.

In one embodiment the lead includes a sheath extending at least part way along a length of the lead and wherein the sheath defines a hook shaped to loop over and behind an ear of the subject.

In one embodiment one of the arms is configured to be positioned within a concha of the user.

In one embodiment the arms are pivotally connected about a mid-portion.

In one embodiment a distal ends of the arms are biased together using a biasing mechanism.

In one embodiment the biasing mechanism includes at least one of: a pivot; a spring; a rubber member; a malleable member interconnecting the arms; at least partially malleable arms; an at least partially elastic member interconnecting the arms; at least partially elastic arms; and, magnets provided on the arms.

In one embodiment a proximal outer face of the arms include a depression configured to allow a subject to engage the arms and bias the arms apart.

In one embodiment the arms have at least one of: a length that is at least one of: greater than 15 mm; greater than 16 mm; greater than 17 mm; greater than 18 mm; greater than 19 mm; greater than 20 mm; greater than 21 mm; less than 30 mm; less than 28 mm; less than 27 mm; less than 26 mm; less than 25 mm; less than 24 mm; less than 23 mm; about 22 mm; and, a width that is at least one of: greater than 5 mm; greater than 6 mm; greater than 7 mm; greater than 8 mm; greater than 9 mm; greater than 10 mm; less than 16 mm; less than 15 mm; less than 14 mm; less than 13 mm; less than 12 mm; about 11 mm.

In one embodiment the electrodes are: substantially circular; rounded rectangular; rounded square; at least partially dome shaped; have a diameter of at least one of: greater than 4 mm; greater than 5 mm; greater than 6 mm; greater than 7 mm; less than 12 mm; less than 11 mm; less than 10 mm; less than 9 mm; and, about 8 mm.

In one embodiment a surface of the electrodes at least one of: is roughened; includes grooves; includes ridges; and, is coated.

In one embodiment a surface of the electrodes is coated with at least one of: an inert metal; and, gold.

In one embodiment therapy signals are signals having a frequency that is at least one of: less than 20 kHz; less than 10 kHz; less than 1 kHz; less than 500 Hz; less than 200 Hz; less than 150 Hz; less than 100 Hz; less than 75 Hz; greater than 1 Hz; greater than 2 Hz; greater than 5 Hz; greater than 10 Hz; greater than 20 Hz; about 20 Hz; and, about 50 Hz.

In one embodiment therapy signals are signals having a pulse width of at least one of: less than 5,000 μs; less than 2,500 μs; less than 1,000 μs; less than 500 μs; less than 200 μs; less than 100 μs; less than 75 μs; greater than 1 μs; greater than 2 μs; greater than 5 μs; greater than 10 μs; greater than 20 μs; and, about 50 μs.

In one embodiment the therapy signals are signals having a voltage that is at least one of: less than 50V; less than 25V; less than 10V; less than 5V; less than 2V; less than 1V; greater than 0.1V; greater than 0.2V; greater than 0.5V; and, greater than 1V.

In one embodiment the therapy signals are signals having a current that is at least one of: less than 50 mA; greater than 0.1 mA; and, between 0.1 mA and 36 mA.

In one embodiment the therapy signals at least one of: are symmetrical; are asymmetrical; are monophasic; are bi-phasic; are tri-phasic; are poly-phasic; and, include multiple phases with at least one interspersed dwell.

In one embodiment a respective therapy signal is applied to each of the electrodes.

In one embodiment the respective therapy signals are at least one of: in phase; and, out of phase.

In one embodiment the lead includes at least one of: a respective conductor for each electrode; at least one insulating layer; and, a braided shield.

In one embodiment the therapy signals are configured to at least one of: stimulate activity of the vagus nerve; and, inhibit activity of the vagus nerve.

In one embodiment the signal generator is mounted on the clip.

In one embodiment the system includes a control system having a housing containing at least one of: the signal generator; a power supply; and, a controller.

In one embodiment a lead extends from the clip to the housing.

In one embodiment the system includes a controller configured to control the signal generator.

In one embodiment the controller is configured to: determine therapy signal parameters; and, control the signal generator in accordance with the therapy signal parameters.

In one embodiment the controller is configured to determine the therapy signal parameters in accordance with at least one of: defined therapy signal parameters stored in a memory; user input commands; biofeedback; neurofeedback; signals from a sensor; and, a selected therapy mode.

In one embodiment the system includes a sensor configured to sense at least one subject parameter and wherein the controller is configured to: determine at least one subject parameter using signals from the sensor; and, cause the signal generator to generate therapy signals in accordance with the at least one subject parameter.

In one embodiment the sensor is at least one of: mounted on the clip proximate at least one electrode; electrically coupled to at least one of the electrodes; a wearable sensor; provided on a wearable band; and, provided on a wearable wrist band.

In one embodiment the sensor is at least one of: an inflammatory biomarker sensor; a temperature sensor; a blood oxygen sensor; a pulse oximeter; a heart rate sensor; and, an impedance sensor.

In one embodiment the at least one subject parameter includes at least one of: a presence, absence or concentration of an inflammatory biomarker; a temperature; a blood oxygen level; a heart rate; a heart rate variability; an impedance; and, a galvanic skin response.

In one embodiment the controller is configured to: monitor a heart rate of the subject based on signals from the sensor; and, cause the signal generator to generate the therapy signals at least partially in accordance with the feedback.

In one embodiment the controller is configured to: cause the signal generator to generate progressively therapy signals having progressively changing parameters; monitor a heart rate of the subject based on signals from the sensor whilst the therapy signals change; detect changes in heart rate; set a therapy signal parameter threshold based on a parameter of the therapy signal when changes in heart rate are detected; and, cause the signal generator to generate therapy signals based on the therapy signal parameter threshold.

In one embodiment the therapy signal parameter threshold is a therapy signal magnitude and is 50%-60% of the therapy signal magnitude being applied when the change in heart rate is detected.

In one embodiment the controller is configured to: cause the signal generator to generate the therapy signals; monitor changes in a heart rate of the subject based on signals from the sensor, in response to the applied therapy signals; and, at least one of: cause the signal generator to generate therapy signals based on monitored changes in heart rate; and, analyse monitored changes in heart rate to determine a heart variability in response to the applied therapy signals.

In one embodiment the controller is configured to use the heart rate variability to generate an inflammatory indicator indicative of a presence, absence or degree of inflammatory markers within the subject.

In one embodiment the inflammatory indicator is inversely proportional to the heart rate variability.

In one embodiment the controller is configured to use the heart rate variability to generate a predictive indicator indicative of a responsiveness to the therapy signals.

In one embodiment the predictive indicator is indicative of a responsiveness to atrial fibrillation therapy.

In one embodiment the controller is configured to: determine feedback using user input commands; and, cause the signal generator to generate the therapy signals in accordance with the feedback.

In one embodiment the controller is configured to: cause the signal generator to generate therapy signals having progressively changing parameters; and, selecting one or more therapy signal parameters in response to user input commands.

In one embodiment the parameters include at least one of: a therapy signal pulse width; a therapy signal magnitude; and, a therapy signal frequency; and, a therapy signal waveform shape.

In one embodiment the controller is configured to progressively increase the therapy signal in steps of at least one of: 0.1 mA; 0.2 mA; 0.5 mA; 0.8 mA; 1 mA; 1.5 mA; and, 2 mA.

In one embodiment the controller is configured to: determine selection of a therapy mode in accordance with user input commands; and, control the signal generator in accordance with the selected mode.

In one embodiment the system includes a number of therapy modes stored in a store, each therapy mode defining a sequence of therapy signals and wherein the controller is configured to cause the signal generator to generate the sequence of therapy signals.

In one embodiment in a research mode the controller is configured to at least one of: select a therapy signal magnitude in response to user input commands and progressively decrease the therapy signal magnitude to zero; and, deliver non-electrical stimulus.

In one embodiment the controller includes at least one of: at least one processing device; a software application executed by a client device; and, an external controller wirelessly connected to at least one of: the signal generator; and, at least one sensor.

In one embodiment the system includes a stimulator configured to apply stimulus to the subject.

In one embodiment the stimulator includes at least one of: an audio stimulator; a vibratory stimulator; an optical stimulator; and, a thermal stimulator.

In one embodiment the stimulator is incorporated into the clip.

In one embodiment the stimulator is controlled by a controller to cause stimulus to be applied in conjunction with the therapy signals.

In one embodiment the nerve stimulation system is configured to treat at least one of: depression; mental health disorders; autonomic nervous system dysfunction; stress; heart failure; traumatic brain injury; disorders of consciousness; inflammatory disorders; autoimmune disorders; cognitive dysfunction; infections; symptoms of infections; respiratory dysfunction; post viral syndrome; fatigue; post traumatic stress disorder; cancer; fibromyalgia; postural orthostatic tachycardia syndrome; myocardial infarction; and, atrial fibrillation.

In one embodiment the nerve stimulation system is configured to enhance at least one of: physical performance; and, cognitive function.

In one broad form, an aspect of the present invention seeks to provide a vagus nerve stimulation method for stimulating a vagus nerve in a biological subject, the method including: attaching a clip to a tragus of the subject, the clip including: opposing arms configured so that a distal end of the arms are biased towards each other; and, electrodes positioned proximate a distal end of the arms on opposing faces so that the electrodes are urged into engagement with opposing faces of the tragus; and, using a signal generator electrically connected to the electrodes to generate at least one therapy signal that is applied to the vagus nerve within the tragus via the electrodes to thereby modulate the vagus nerve.

In one broad form, an aspect of the present invention seeks to provide a system for treating at least one of depression and atrial fibrillation, the apparatus including: a clip configured to be attached to a tragus of the subject, the clip including: opposing arms configured so that a distal end of the arms are biased towards each other; and, electrodes positioned proximate a distal end of the arms on opposing faces so that the electrodes are urged into engagement with opposing faces of the tragus; and, a signal generator electrically connected to the electrodes, the signal generator being configured to generate at least one therapy signal that is applied to the vagus nerve within the tragus via the electrodes to thereby modulate the vagus nerve.

In one broad form, an aspect of the present invention seeks to provide a method for treating at least one of depression and atrial fibrillation, the method including: attaching a clip to a tragus of the subject, the clip including: opposing arms configured so that a distal end of the arms are biased towards each other; and, electrodes positioned proximate a distal end of the arms on opposing faces so that the electrodes are urged into engagement with opposing faces of the tragus; and, using a signal generator electrically connected to the electrodes to generate at least one therapy signal that is applied to the vagus nerve within the tragus via the electrodes to thereby modulate the vagus nerve.

In one broad form, an aspect of the present invention seeks to provide a vagus nerve stimulation system for stimulating a vagus nerve in a biological subject, the system including: a securing member configured to be attached to a tragus of the subject so that the electrodes are urged into engagement with opposing faces of the tragus; and, a signal generator electrically connected to the electrodes, the signal generator being configured to generate at least one therapy signal that is applied to the vagus nerve within the tragus via the electrodes, to thereby modulate the vagus nerve.

In one broad form, an aspect of the present invention seeks to provide a vagus nerve stimulation method for stimulating a vagus nerve in a biological subject, the method including: attaching a securing member to a tragus of the subject so that electrodes are urged into engagement with opposing faces of the tragus; and, using a signal generator electrically connected to the electrodes to generate at least one therapy signal that is applied to the vagus nerve within the tragus via the electrodes to thereby modulate the vagus nerve.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

Various examples and embodiments of the present invention will now be described with reference to the accompanying drawings, in which:

FIG. 4A is schematic side view of a specific example of a clip for a vagus nerve stimulation system;

FIG. 4B is a schematic plan view of the clip of FIG. 4A;

FIG. 4C is a schematic perspective view of the clip of FIG. 4B;

FIG. 4D is a schematic front view of the clip of FIG. 4A;

FIG. 4E is a schematic rear view of the clip of FIG. 4A;

FIG. 4F is a schematic close up view of a pivot of the clip of FIG. 4A;

DETAILED DESCRIPTION OF THE PREFERRED EMBODIMENTS

Figure 1A:
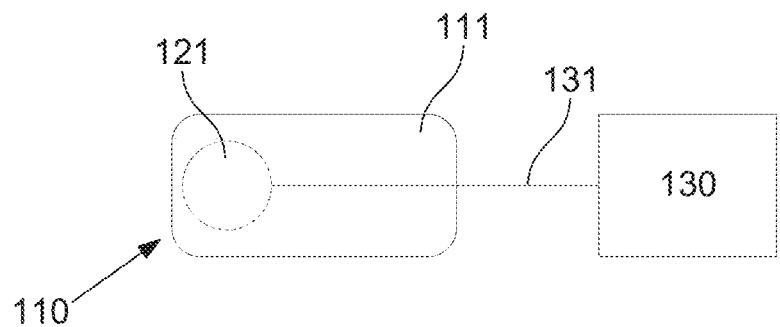
FIG. 1A is a schematic plan view of an example of a vagus nerve stimulation system.
Figure 1B:
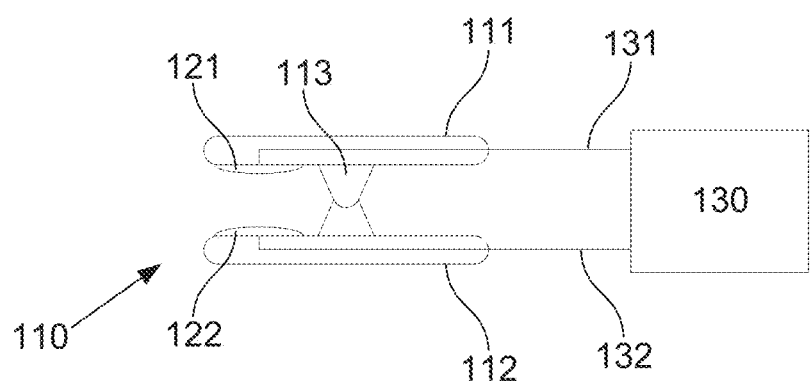
FIG. 1B is a schematic side view of the nerve stimulation system of FIG. 1A.

An example of a vagus nerve stimulation system will now be described with reference to FIG. 1A to 1D.

In this example, the nerve stimulation system 100 includes a securing member configured to be attached to a tragus of the subject so that electrodes are urged into engagement with opposing faces of the tragus.

In one example, the securing member is in the form of a clip 110 having opposing arms 111, 112, with electrodes 121, 122 positioned proximate a distal end of the arms on opposing faces, which are biased towards each other. In this example, the arms are pivotally connected via a connecting hinge 113, whilst a resilient member, such as a spring, rubber stop, or the like, is provided, which is configured to bias the distal end of the arms towards each other. However, as will be described in more detail below, other configurations could be used.

In this regard, it will therefore be appreciated that the term securing member is intended to cover any arrangement that can secure the nerve stimulation system in position so that electrodes are held in contact with the tragus. In one specific example, the securing member is in the form of a clip, in which spaced apart arms are provided that can be biased together at distal ends, and the example arrangements described herein are not intended to be limiting. Whilst reference through the following description will focus on a clip, it will be appreciated that the techniques described herein could be applied to other non-clip style securing members.

A signal generator 130 is electrically connected to the electrodes 121, 122, for example via respective connections 131, 132, with the signal generator 130 being configured to generate at least one therapy signal, which can then be applied to the subject via the electrodes 121, 122.

Figure 1C:
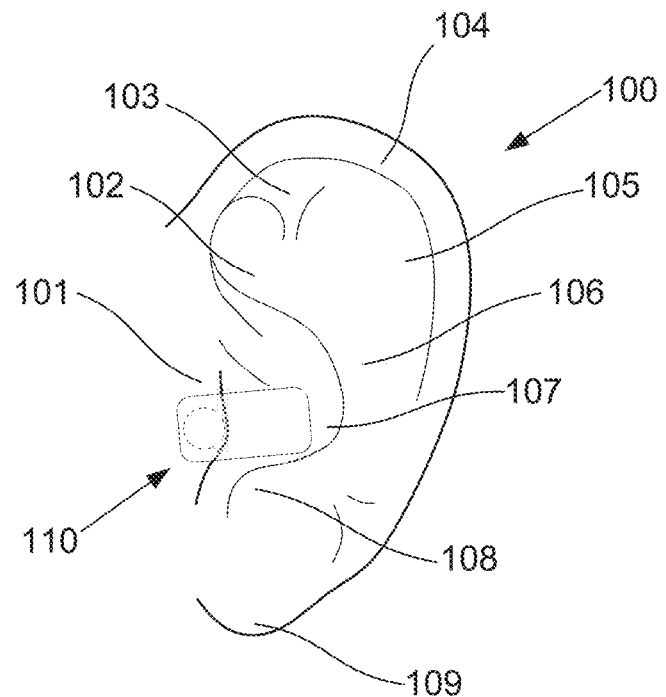
FIG. 1C is a schematic plan view of the clip of FIG. 1A in use.
Figure 1D:
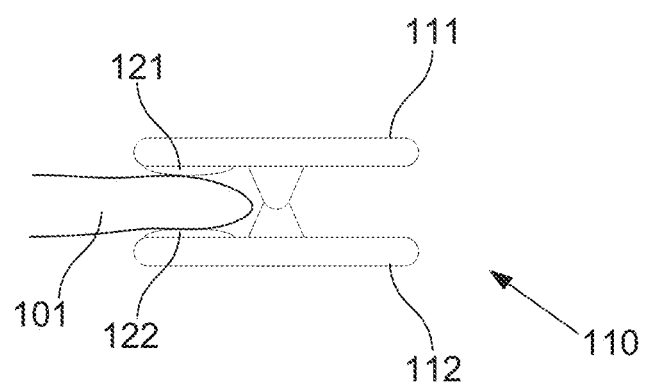
FIG. 1D is a schematic side view of the clip of FIG. 1A in use.

In use, the clip is configured to be attached to a tragus of a subject, and an example of this will now be described with reference to FIGS. 1C and 1D.

In this example, a subject's ear 100 is shown, including a tragus 101, an inferior crus 102, a superior crus 103, a helix 104, a scapha 105, an antihelix 106, a concha 107, an antitragus 108 and a lobule 109. As shown, the clip 110 is positioned so that the tragus 101 is provided between the electrodes 121, 122, with the electrodes 121, 122 being urged into engagement with opposing faces of the tragus by virtue of biasing of the arms 111, 112.

As a result of this configuration, therapy signals applied to the electrodes 121, 122 are applied to the tragus, which in turn results in an electric field being generated surrounding the vagus nerve within the tragus 101. This field can create or inhibit action potentials within the tragus, in turn leading to modulation of the vagus nerve.

Accordingly, the above described nerve stimulation system operates to stimulate the vagus nerve within the tragus (providing Low Level Tragus Stimulation) utilising a clip 110 which is attached to the tragus 101 of a subject in use. The clip includes electrodes 121, 122 on opposing biased arms 111, 112, so that the tragus 101 can be positioned between the electrodes, with the electrodes 121, 122 being urged into engagement with the tragus 101. In this manner, the electrodes 121, 122 grip the tragus, which helps ensure good electrical contact with the tragus 101 thereby maximising the effectiveness of modulation of the vagus nerve. Additionally, having the electrodes grip the tragus also assists in securing the clip in place, allowing the clip to be worn for a prolonged period of time, thereby ensuring the stimulation signals are successfully applied to the vagus nerve throughout a stimulation session.

The configuration of the electrodes provided on opposing arms, also leads to the electrodes being provided in a substantially parallel spaced configuration, with electrodes on either side of the tragus. This configuration can allow for an increased electrode surface area, which combined with the substantially parallel positioning, maximises the field generated for a given current density at the electrode/tissue interface.

Accordingly, the above arrangement can help ensure the applied therapy signals are able to generate a therapeutic effect whilst avoiding current densities that can cause discomfort to the subject, for example by causing burns.

Additionally, the above described arrangement helps maintain safety and efficacy. In this regard, by optimising the effectiveness of signal application, this ensures the correct stimulation is achieved, avoiding over or under stimulation, which can lead to adverse consequences, such as bradycardia.

Furthermore, in one example, the above described arrangement allows the clip 110 to be at least partially positioned within the concha 107, which provides a number of benefits. For example, this guides positioning of the clip 110 so that the electrodes are correctly positioned relative to the tragus and vagus nerve, thereby ensuring the nerve is effectively modulated. Additionally, this arrangement reduces the extent to which the clip projects outwardly from the ear, making the clip unobtrusive and comfortable to wear. For example, this allows the clip to be worn while the user is laying on their side, whilst also reducing the risk of the clip being dislodged, which can in turn affect the stimulation process.

Accordingly, the above described arrangement provides a non-invasive vagus nerve stimulation system that can be used to modulate the vagus nerve, but which is comfortable and easy to use over prolonged periods of time, thereby allowing users to more readily avail themselves to the benefits of vagus nerve stimulation, whilst avoiding risk, safety and efficacy issues, such as burns and/or unsafe or ineffective levels of neurostimulation.

A number of further features will now be described.

In one example, the system includes a hook extending over and behind an ear of the subject, to at least partially support the clip. The hook can be of any appropriate form, but is typically made from an at least partially resilient material which retains its shape whilst being comfortable to wear. The hook can be attached to any part of the clip, but in one example is configured to extend laterally from the clip so that the hook can loop over and behind the ear of the subject. The hook can help distribute the weight of the clip across the ear, so that the weight is not solely supported by the tragus. Additionally, this provides a secondary attachment mechanism, helping reduce the likelihood of the clip being dislodged, and preventing the clip falling to the ground in the event of dislodgment, in turn helping to reduce the chance of damage to the clip. Furthermore, this also helps guide correct positioning of the clip, ensuring the electrodes are aligned with the vagus nerve, in turn optimising the effect of the applied therapy signals.

In one example, the system includes a lead extending from the clip, with the lead including the connections that are configured to electrically connect the electrodes to the signal generator. This allows the signal generator to be provided remotely to the clip and connected thereto via the connections. This can reduce the weight of the clip, although this is not essential and alternative embodiments could be provided, as will be described in more detail below.

In one particular example, the lead is configured to extend laterally from the clip, so that the lead can loop over and behind an ear of the subject, thereby allowing the lead to help secure the clip in place. It will be appreciated that in this instance, the lead can act to provide the hook functionality outlined above, thereby helping to reduce weight loading on the tragus and minimising the likelihood and adverse effects of clip dislodgement.

In one example, the lead can be configured to extend from a distal end of an outer one of the arms. This helps secure the clip in place, whilst leaving a proximal end of the arms unimpeded, which can facilitate application of the clip to the tragus. Additionally, this further aligns the lead with the tragus and directs the lead to more easily extend behind the helix, making the clip more comfortable to wear and helping ensure correct positioning of the clip.

In one particular example, the lead includes a sheath extending at least partway along the lead, with the sheath defining the hook shape to loop over and behind an ear of the subject. In this example, the sheath can have greater resilience than unsheathed portions of the lead, which can help maintain the shape of the lead in the region of the ear, whilst allowing the lead to remain freely flexible in other regions, making this more convenient for use. This also helps protect the lead where the lead joins the clip, and for example reduces the chances of forces decoupling the lead from the clip, or damaging electrical connections between the clip and the lead.

As mentioned above, in one example at least one of the arms, and in particular an inner arm 111, is positioned within a concha of the user. This allows the clip to grip the tragus whilst allowing the tragus to remain in a substantially natural position, making the clip comfortable to wear. This also reduces the extent to which the clip extends outwardly from the ear, which can in turn reduce the likelihood of the clip being knocked and dislodged, whilst also making the clip comfortable to wear whilst the ear is resting on a pillow or other surface, making the arrangement particularly suited for long term use. Furthermore, this also helps guide correct positioning of the clip, ensuring the electrodes are correctly positioned on the tragus, and hence aligned with the vagus nerve, in turn optimising the effect of the applied therapy signals.

In one example, the arms are pivotally connected about a mid-portion, although this is not essential and other arrangements could be used. For example, the arms could be made of or be interconnected by a malleable material, allowing the arms to be deformed into a desired shape, so that distal ends of the arms are biased into engagement with the tragus.

The clip also typically includes a biasing mechanism to bias distal ends of the arms into engagement. The nature of the biasing mechanism can vary depending on the preferred implementation and could include the use of a spring or rubber member positioned between the arms. The biasing could be achieved using a malleable member interconnecting the arms or at least partially malleable arms, an at least partially elastic member interconnecting the arms or at least partially elastic arms.

In a further example, the biasing could be achieved using magnets provided in the arms. For example magnets with opposing polarities could be provided in distal ends of the arms to attract the distal ends of the arms together. It will be appreciated that this arrangement induces a magnetic field surrounding the tragus, which can be used to enhance or modulate the applied therapy signals, thereby improving safety and/or efficacy. Alternatively, magnets with like polarities could be provided in proximal ends of the arms to urge the proximal ends apart.

In one preferred example, the arms are pivotally connected and optionally biased about a mid-portion, allowing a proximal end of the arms to be biased together to urge the distal ends and hence the electrodes apart, thereby making the clip easy to apply. This arrangement can also help ensure the arms are approximately parallel when the tragus is positioned between the arms, which helps position the electrodes and ensure maximum surface contact between the electrodes and the tragus, in turn reducing the current density required to achieve effective stimulation and thereby improve efficacy and reduce burns.

In one example, to further facilitate this process, a proximal outer face of the arms includes a depression configured to guide positioning of a subject so that they can engage the arms and bias the arms apart, for example by grasping the proximal ends of the arms between a thumb and forefinger.

In one example, the arms have a length that is greater than 15 mm, greater than 16 mm, greater than 17 mm, greater than 18 mm, greater than 19 mm, greater than 20 mm, greater than 21 mm, less than 30 mm, less than 28 mm, less than 27 mm, less than 26 mm, less than 25 mm, less than 24 mm, less than 23 mm, and more typically is about 22 mm. Similarly the arms typically have a width that is greater than 5 mm, greater than 6 mm, greater than 7 mm, greater than 8 mm, greater than 9 mm, greater than 10 mm, less than 16 mm, less than 15 mm, less than 14 mm, less than 13 mm, less than 12 mm, and more typically about 11 mm. These dimensions make the arms easy to manipulate, whilst allowing the clip to be positioned within the concha making the clip comfortable to wear.

Additionally, arms dimensioned as above provide a sufficiently large surface area to accommodate the electrodes. In this regard, the electrodes are typically substantially circular, although rounded rectangular or rounded square shaped could be used. The electrodes are also optionally at least partially domed-shaped, which can help ensure that the electrodes make good electrical contact with the tragus, irrespective of a relative angle of the arms. Furthermore, the use of domed-shaped and substantially circular electrodes ensures that the electrodes do not include any sharp edges, which could cause discomfort.

Typically, the electrodes have a diameter that is greater than 4 mm, greater than 5 mm, greater than 6 mm, greater than 7 mm, less than 12 mm, less than 11 mm, less than 10 mm, less than 9 mm and more typically about 8 mm. These dimensions provide a surface area that allows a sufficiently large current to be applied to induce a field that can effectively stimulate the vagus nerve, without resulting in an excessive charge or current density on the surface of the tragus, which can in turn cause discomfort or burns and/or result in ineffective treatment. The electrodes also act as a contact surface with the tragus, and including a sufficiently large electrode surface area can help ensure the clip effectively couples to the tragus and remains in place, even when subject to external forces.

Additionally and/or alternatively, a surface of the electrodes can be roughened, or could include grooves or ridges. The use of roughened or profiled electrode surfaces can firstly increase the friction between the electrode and the tragus, which in turn helps maintain a position of the clip. Additionally, roughening or including grooves or ridges on the electrode surface can help ensure good electrical contact between the electrode and the tragus. For example, this can help minimise disruption caused by uneven surfaces, such as bumps on the tragus, or similar. A further benefit is that surface roughness leads to an increase in the overall surface area of the electrodes, which in turn helps reduce the current density required to generate a given field within the tragus, which in turn helps ensure efficacy, whilst avoiding excessive current densities that can lead to burns.

In one example, the electrodes could also be coated, for example to improve electrical conductivity, increase surface friction and ensure biocompatibility. Any form of conductive coating could be used, and in one example, the electrodes are formed from copper electrodes coated with an inert metal, such as gold or other similar highly-conductive material.

The signal generator is typically configured to generated therapy signals having a frequency that this at least one of less than 20 kHz, less than 10 kHz, less than 1 kHz, less than 500 Hz, less than 200 Hz, less than 150 Hz, less than 100 Hz, less than 75 Hz, greater than 1 Hz, greater than 2 Hz, greater than 5 Hz, greater than 10 Hz, greater than 20 Hz, about 20 Hz and more typically about 50 Hz. The therapy signals typically have a pulse width that is less than 5,000 µs, less than 2,500 µs, less than 1,000 µs, less than 500 µs, less than 200 µs, less than 100 µs, less than 75 µs, greater than 1 µs, greater than 2 µs, greater than 5 µs, greater than 10 µs, greater than 20 µs, and, more typically is about 50 µs. The therapy signals typically have a voltage that is less than 50V, less than 25V, less than 10V, less than 5V, less than 2V, less than 1V, greater than 0.1V, greater than 0.2V, greater than 0.5V, and, more typically greater than 1V. The therapy signals typically have a current magnitude that is less than 50 mA, greater than 1 mA, greater than 0.1 mA, and, between 0.1 mA and 36 mA.

The therapy signals can be symmetrical, asymmetrical, monophasic or biphasic. In this regard, the use of symmetrical bi-phasic signals can help reduce charge build up on a surface of the tragus, which in turn maximises the electrical fields generated within the tragus as a result of the applied therapy signal, whilst preventing charge building up to a level that can cause discomfort. This in turn helps optimise stimulation of the vagus nerve. Nevertheless, asymmetrical and/or monophasic therapy signals could be used in some circumstances, depending for example on the intended application. Additionally and/or alternatively tri-phasic or more broadly poly-phasic signals could be used. In one example, asymmetric tri-phasic signals can be used with negative pulses having a smaller magnitude and duration than an intervening positive pulse, which can help reduce charge build up. Signals could also include multiple phases with an intervening dwell time, allowing a charge to remain in place for a short duration, before this is discharged.

The therapy signals are typically configured to at least one of stimulate or inhibit activity within the vagus nerve, and it will be appreciated from this that the signal parameters used, such as the voltage, current, frequency and waveform can be selected depending on the intended application and the desired effect of the modulation on the vagus nerve.

In one example, one of the electrodes 121, 122 acts as ground, with the therapy signals being applied via the other electrode. However, this is not essential, and in one example, therapy signals can be applied to each of the electrodes. The therapy signals could be in phase, but more typically are out of phase, to maximise an overall field gradient across the vagus nerve, which in turn helps generate action potentials within the nerve. Additionally, this helps minimise the magnitude of the current applied via each electrode in order to generate a given electric field, which in turn helps reduce discomfort, whilst ensuring the system remains clinically effective.

In general, where a lead is used, the lead includes a respective conductor for each electrode, with the conductors being contained within an insulating layer and optionally surrounded by a braided shield. This helps ensure electrical isolation between connections, whilst providing a connecting lead that is strong and lightweight.

In one example, the system typically includes a control system having a housing containing the signal generator together with other associated electronics, such as a power supply and/or a controller. The controller is configured to control the signal generator allowing a range of different desired therapy signals to be generated. The controller may be of any appropriate form, but typically includes one or more electronic processing devices, such as a microprocessor, microchip processor, logic gate configuration, firmware optionally associated with implementing logic such as an FPGA (Field Programmable Gate Array), or any other electronic device, system or arrangement. For ease of illustration the remaining description will refer generally to a controller which is formed from a processing device, but it will be appreciated that multiple processing devices could be used, with processing distributed between the devices as needed, and that reference to the singular encompasses the plural arrangement and vice versa.

In one example, the lead extends from the clip to the housing so that therapy signals generated by the signal generator can be applied to the electrodes. However, as previously discussed, this is not essential, and in alternative embodiments, the signal generator can be mounted on the clip. In this example, the controller could be integrated into a housing forming part of the clip, or alternatively, the controller could communicate with the signal generator via wireless connections, such as Bluetooth, allowing the signal generator to be controlled remotely using a suitable device, such as a smart phone or other client device, which then acts as the controller.

In one example, the controller is configured to determine therapy signal parameters and, control the signal generator in accordance with the therapy signal parameters. The therapy signal parameters could be determined in any one of a number of ways, including retrieving defined therapy signal parameters stored in a memory, based on signals from a sensor, based on biofeedback, neurofeedback, based on user input commands and/or a selected therapy mode. For example, a number of different operating modes could be defined, with the user selecting a therapy mode depending on the use application, and the controller retrieving therapy signal parameters depending on the selected mode. This allows the system to be used to achieve a range of different outcomes, such as stimulating and/or inhibiting the vagus nerve, depending on requirements of the user. Additionally, this allows the controller to determine feedback, for example using signals from a sensor, and adjust the therapy signals based on the feedback, so that the therapy signals can be optimised for the subject, and in particular the response of the subject to the signals. Thus, a software based control system can be implemented in conjunction with feedback from a sensor, to dynamically adjust the applied stimulation and thereby optimise this for the intended application.

In one example, the system includes a sensor configured to sense at least one subject parameter. The sensor could be of any appropriate form depending on the preferred implementation and could include any one or more of an inflammatory biomarker sensor, a temperature sensor, a blood oxygen sensor, a pulse oximeter, a heart rate sensor or an impedance sensor. The sensor could be formed at least in part from the electrodes. For example, a heart rate sensor could utilise a voltage sensor coupled to the electrodes to detect electrical signals, such as electrocardiogram (ECG) signals, whilst an impedance sensor might include a voltage sensor coupled to the electrodes to measure voltages across the tragus resulting from current signals applied by the signal generator. Alternatively, a separate sensor could be used and may be mounted on the clip proximate the electrodes. For example a pulse oximeter typically includes an infrared sensor, such as a photodiode, and infrared light emitting diodes (LEDs), in which case the LEDs could be positioned on one arm, with the photodiode on the other to detect infrared radiation transmitted through the tragus. In one example, the electrodes could be transparent electrodes made from Indium Tin Oxide (ITO) or other similar materials, with the LEDs and photodiodes positioned behind the electrodes.

A sensor could also be provided that is separate to the clip. The sensor could be a wearable sensor, for example incorporated into a wearable band, such as a wrist or chest band, although this not intended to be limiting and any suitable sensor could be used, including sensors incorporated into fitness monitoring devices, smartwatches, mobile phones, medical equipment, photoplethysmogram sensors, electroencephalogram sensor, electrocardiogram sensors, or the like. In this instance, sensor signals can be transferred to a controller (discussed in more detail below) using appropriate wired or wireless connections, such as Bluetooth, allowing signals from the sensor to be used to monitor the subject and/or to provide biofeedback to control the stimulation system.

Irrespective of the sensor employed, the controller can be configured to determine at least one subject parameter using signals from the sensor and cause the signal generator to generate therapy signals in accordance with the at least one subject parameter. Thus, for example, the controller can determine a subject parameter such as a presence, absence or concentration of an inflammatory biomarker, a temperature, a blood oxygen level, a heart rate, a heart rate variability (HRV), an impedance or a galvanic skin response, and use this as biofeedback to assess the effectiveness of an applied therapy. This can then be used to adjust the applied therapy signals, for example increasing a magnitude or altering a frequency of the therapy signals to optimise the therapy signals for the responsiveness of the respective subject. In this regard, it will be appreciated that the manner in which signals should be adjusted can be defined in memory, and could include scaling signals based on measured subject parameters.

In one particular example, the controller is configured to use biofeedback from heart rate sensors by monitoring a heart rate of the subject based on signals from the sensor and then causing the signal generator to generate the therapy signals at least partially in accordance with the feedback. Thus, in this instance, the controller can be responsive to changes in heart rate to control the applied therapy signals, for example adapting the applied signals to thereby maximise the effectiveness of the therapy signals.

In one particular example, this can be used in order to define thresholds for various signal parameters, such as a frequency, pulse width or magnitude of the therapy signals, both to ensure safety and efficacy of the signals. Whilst this can be performed using signals from any of the sensors, in general this is performed based on signals from a heart rate sensor, as the heart rate is particularly responsive to the applied therapy signals. In one example, the controller is configured to cause the signal generator to generate progressively therapy signals having progressively changing parameters, such as progressively increasing or decreasing magnitudes, frequencies, or the like. As the therapy signals are applied, the controller monitors a heart rate of the subject based on signals from the sensor, using the signals to detect changes in heart rate. Changes in the heart rate can then be used to set a therapy signal parameter threshold based on a parameter of the therapy signal when changes in heart rate are detected, allowing therapy signals to be generated based on the therapy signal parameter threshold. Accordingly, it will be appreciated that feedback from sensors, such as an indication of HRV can be used to determine an optimal treatment threshold.

In one particular example, the above described process is performed to progressively increase a therapy signal magnitude to thereby detect a bradycardia threshold, which triggers a reduction in heart rate. In this instance, a first safety threshold can be set at the bradycardia threshold to ensure the therapy signal does not exceed this value in future, to ensure the system can be safely used with that subject. Additionally, and/or alternatively, this can be used to set a threshold to optimise therapeutic efficacy. This is typically achieved by setting a threshold equal to between at least 20% of, and more typically between 50-60% of the bradycardia safety threshold, which results in optimal therapeutic stimulation for the subject.

In another example, the controller can be configured to cause the signal generator to generate the therapy signals and then monitor changes in a heart rate of the subject based on signals from the sensor, in response to the applied therapy signals. This can be used to generate therapy signals based on monitored changes in heart rate, so that the signals are constantly or periodically adapted to changes in heart rate, again to ensure safety and/or efficacy. Additionally and/or alternatively, the controller can be configured to analyse monitored changes in heart rate to determine a heart rate variability in response to the applied therapy signals. The heart rate variability can provide useful feedback for a number of reasons.

For example, the controller can be configured to use the heart rate variability to generate an inflammatory indicator indicative of a presence, absence or degree of inflammatory markers within the subject. In one example, this can be used to create a baseline Inflammatory index score for patients based on their HRV. In this regard, it has been shown that HRV can be a reliable index of cardiac vagal regulation and is inversely related to levels of inflammatory markers (see: "Heart Rate Variability Predicts Levels of Inflammatory Markers: Evidence for the Vagal Anti-Inflammatory Pathway" by Timothy M. Cooper, Paula S. McKinley, Teresa E. Seeman, Tse-Hwei Choo, Seonjoo Lee, and Richard P. Sloan, Brain Behav Immun. 2015 October; 49: 94-100). Thus, in one example, the HRV is used to generate an inflammatory indicator that is inversely proportional to HRV.

In another example, HRV can be used to generate a predictive indicator indicative of a responsiveness to the therapy signals, for example to determine a potential responsiveness to atrial fibrillation therapy. In this regard studies (see: Stavrakis, S., Stoner, J. A., Humphrey, M. B., Morris, L., Filiberti, A., Reynolds, J. C., . . . & Varahan, S. (2020). TREAT AF (transcutaneous electrical vagus nerve stimulation to suppress atrial fibrillation): a randomized clinical trial. JACC: Clinical Electrophysiology Volume 6, Issue 3, March 2020, Pages 282-291) have demonstrated an initial response to stimulation (extent of change in HRV) can be used to predict whether an individual will be a 'responder' to therapy. In this study, patients whose AF burden decreased by >75% at follow-up were categorized as responders. Thus, feedback can also be used to determine responders or non-responders to treatment through a scoring system derived from HRV scores. For example, higher variations in LF/HF HRV ratio may indicate better responses.

It will also be appreciated that signals from the sensors could be used independently of stimulation, for example to derive indicators, monitor heart rate variability or the like, so that such monitoring can be performed regardless of whether the subject is currently undergoing stimulation.

In another example, the controller can be configured to determine feedback using user input commands and cause the signal generator to generate the therapy signals in accordance with the feedback. Thus, the user could indicate via an input whether they are perceiving any improvement, such as a reduction in anxiety or stress, with this input being used to adjust the applied therapy signals.

In one example, the controller is configured to cause the signal generator to generate therapy signals having progressively changing parameters, such as increasing or decreasing magnitudes, frequencies or pulse widths, or different waveform shapes, and then select one or more therapy signal parameters in response to user input commands. For example, this can again be used to progressively increase magnitude of a current of the therapy signals up until a point at which these are noticeable to the subject, with this level then being used to select a desired therapy signal magnitude. This can be used to maximise the magnitude of the therapy signals, while preventing these creating discomfort for the user. In one example, therapy signals are increased in magnitude in steps of 1 mA from 1 mA to a maximum of 36 mA, although other magnitudes could be used, such as 0.1 mA, 0.2 mA, 0.5 mA, 1.5 mA, 2 mA, or the like.

In another example, the controller can be configured to determine selection of a mode in accordance with user input commands, and then control the signal generator in accordance with the selected mode. In this regard the system typically includes a number of therapy modes stored in a store, each therapy mode defining a sequence of therapy signals, which may be tailored for example to provide a different intervention, treat a different condition, or the like. Thus, the selected mode could be used to control the nature of the therapy signals, and could be used to stimulate or inhibit the vagus nerve, or could be used to switch between symmetric, asymmetric, monophasic and/or biphasic signals, depending upon the preferred implementation. In this instance, the controller is configured to cause the signal generator to generate the sequence of therapy signals, thereby applying the selected intervention.

Thus, it will be appreciated from the above that feedback can be obtained objectively using sensor signals, or subjectively using inputs from the subjects, with the feedback being used to control operation of the stimulation system to ensure safety and/or efficacy.

In another example, a research mode can be provided, which is utilised in order to investigate the effectiveness of stimulation of the vagus nerve. In this regard, the research mode typically operates by selecting therapy signal magnitude, as described above, and then progressively decreasing the therapy signal magnitude to zero, effectively applying a null stimulation, whilst still allowing the subject to proceed with calibration so that they believe stimulation is occurring. This allows a placebo effect to be assessed, and allows a null stimulation process to be used as a control in experiments assessing the effectiveness of the stimulation process.

In a further example, the nerve stimulation system could include a stimulator configured to apply stimulus to the subject. The stimulator and associated stimulus provided could be of any appropriate form, depending on the preferred implementation and/or the particular condition being treated. Example stimulators include an audio stimulator, such as a speaker, a vibratory stimulator such as an offset motor, an optical stimulator such as an LED, or a thermal stimulator such as Peltier cooler or heating element.

The stimulator could be incorporated into the clip, allowing stimulation to be applied to the ear and in some examples the tragus, depending on the nature of the stimulation. However, this is not essential, and in other examples, the stimulator could be provided separately to the clip. For example, the stimulator could be incorporated into a wearable arrangement, such as a wristband or similar, which optionally may also incorporate one or more sensors as previously described. Alternatively, the stimulator could be a separate and optionally non-wearable device.

The stimulation could be used to complement the vagus nerve stimulation, with complementary therapy improving the efficacy of treatment in some instances. In this instance, the controller can be configured to cause stimulus to be applied in conjunction with the therapy signals. More typically however, the stimulation is used in the research mode, for example, as a decoy essentially for a sham controlled study so that the subject believes some form of stimulation is being applied, thereby helping ascertain the degree of effectiveness of the vagus nerve stimulation.

Whilst the system can be used to treat a wide range of different conditions, the nerve stimulation system is particularly suited for use in the treatment of depression or atrial fibrillation, as well as mental health disorders, autonomic nervous system dysfunction, stress, heart failure, traumatic brain injury, disorders of consciousness, inflammatory disorders, autoimmune disorders, cognitive dysfunction, infections, symptoms of infections, respiratory dysfunction, post viral syndrome, fatigue, post traumatic stress disorder, cancer, fibromyalgia, postural orthostatic tachycardia syndrome, or myocardial infarction, or can be used to enhance physical, and in particular athletic, performance and/or cognitive function.

A specific example of controller functionality will now be described with reference to FIG. 2.

In this example, the control system 250 includes a signal generator 230, a controller 251, a memory 252, and input/output device 253, such as input buttons and a display, interconnected via a bus 255. The signal generator 250 is connected to electrodes 221, 222 via a lead 240, containing first and second connections 231, 232.

An external interface 254 can also be provided, which can be a wired or wireless interface, such as Wi-Fi, Bluetooth or another short range wireless communications interface. The external interface 254 can be used to allow an external device, such as a computer system, smart phone or tablet, to interface with the control system, for example to allow therapy signal parameters or operating modes to be updated, or to allow the control system to be remotely controlled. Additionally and/or alternatively the external interface 254 could be connected to a sensor 223, such as a pulse oximeter, heart rate sensor, and/or a stimulator 224, or the like, using a wired and/or wireless connection. In one example, the sensor 223 and/or a stimulator 224 can be integrated into the clip 110, in which case the connection to the sensor 223 and/or a stimulator 224 might be integrated into the lead 240. It will also be appreciated that in other examples, a signal sensor, such as a voltage sensor (not shown) could be connected to the electrodes 221, 222, allowing signals within the body, such as ECG or impedance signals to be sensed. However, this is not essential, and in other examples the sensor 223 and/or a stimulator 224 could be separate from the clip 110, and optionally incorporated into a wearable device, such as a wrist band or similar, in which case separate wired or wireless connections could be used.

In use, the controller 251 executes instructions in the form of applications software stored in the memory 252 to allow the required processes to be performed, and in particular to allow the signal generator 230 to be controlled to thereby generate therapy signals, which are then applied to electrodes 221, 222.

The applications software may include one or more software modules, and may be executed in a suitable execution environment, such as an operating system environment, or the like. The controller could be a microprocessor, microchip processor, logic gate configuration, firmware optionally associated with implementing logic such as an FPGA (Field Programmable Gate Array), or any other electronic device, system or arrangement.

The memory 252 will also typically store information necessary to generate therapy signals, such as details of therapy signal parameters, operating modes or the like, as well as instructions for interpreting any feedback, such as signals from sensors 223 or user input commands, allowing this feedback to be used to control the generation of therapy signals.

It will be appreciated from this that the controller typically includes at least one processing device, and may optionally be distributed between multiple processing devices, with different tasks, such as analysis of sensor signals and/or generating controlled signals, being distributed between the processing devices as needed. In one example, the controller includes a software application executed by a client device, such as a computer system, tablet or smartphone, which could communicate with the signal generator and/or sensor directly, via wired or wireless connections, or could communicate with other processing devices, which are in turn connected to the signal generator and/or sensor. Thus, the controller could be an external controller wirelessly connected to the signal generator and/or sensor(s).

Figure 3:
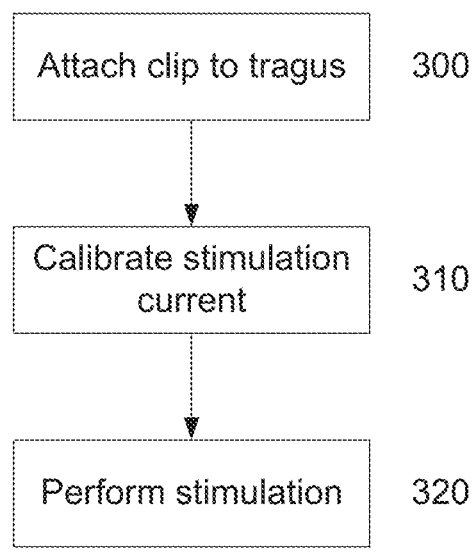
FIG. 3 is a flow chart of an example of a nerve stimulation process.

An example of a process for performing nerve stimulation will now be described with reference to FIG. 3.

In this example, the clip is attached to the tragus at step 300. Typically, this involves biasing arms 111, 112 apart by applying a pressure between thumb and forefinger to a proximal end of each arm 111, 112. The tragus is then positioned between the distal ends of the arms 111, 112, before the clip is released, allowing the electrodes 121, 122 to be urged into contact with the tragus, as shown in FIG. 1D.

Next, at step 310, a therapy signal magnitude is calibrated. This process typically involves having the therapy signals generated with increasing magnitudes, until this is perceptible to the user. In this instance, the user can indicate when the signals are perceived and/or becoming uncomfortable, with this being used to set a maximum magnitude for the therapy signals.

Following this, at step 320 stimulation is performed by applying therapy signals. In this regard, the controller 251 will typically retrieve therapy signal parameters from the memory, optionally in accordance with an operating mode and/or user input commands, using these to control the signal generator 230 so that desired therapy signals are generated.

A specific example of a nerve stimulation system will now be described in more detail with reference to FIGS. 4A to 4G.

In this example, the nerve stimulation system includes a clip 410, having first and second arms 411, 412. The first and second arms 411, 412 are interconnected via a pivotal mounting 413, which is formed from spaced parallel upstanding members 413.1, 413.2 extending upwardly from inner surfaces of each of the first and second arms 411, 412. A pin is provided extending through the upstanding members to allow pivotal movement of the arms, whilst a spring 413.3 is mounted on the pin, so as to bias distal ends of the arms together.

Recesses 411.1, 412.1 are provided on outer faces of proximal ends of each of the first and second arms 411, 412, with the recesses 412.1 being configured to align with a user's thumb and forefinger, so that applying pressure between the thumb and forefinger biases distal ends of the 411.1, 412.1 apart.

Electrodes 421, 422 are provided on the inner faces of the distal ends of the 411.1, 412.1. The electrodes are circular and dome shaped, so that the electrodes 421, 422 can contact a surface of the tragus when the tragus is positioned between the electrodes 421, 422. In this regard, the upstanding members 413.1, 413.2 are typically dimensioned based on an approximate thickness of the tragus, so that the arms 411, 412 and hence electrodes are substantially parallel when the clip is positioned on the tragus.

Figure 4G:
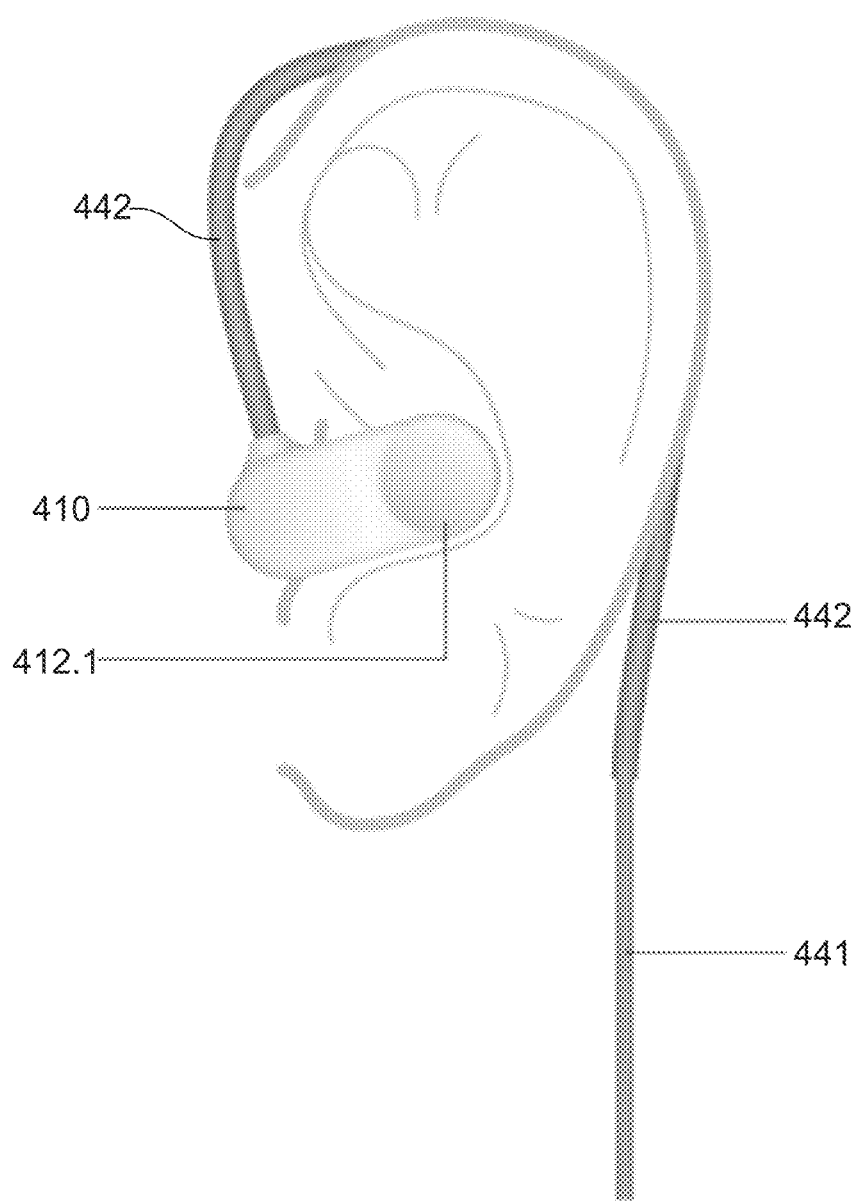
FIG. 4G is a schematic plan view of the clip of FIG. 4A in use.

A lead 440 is provided, including a lead body 441 and a sheath 442, which extends partway along a distal end of the lead body 441. Specifically, the sheath 442 is formed from an overmoulded area that extends from a distal end of the outer arm 412 and has a hook shape, allowing this to be positioned behind the ear, as shown in FIG. 4G. The overmoulded section typically has a length of about 100 mm and is malleable, allowing this to be shaped to conform to the ear of the user. As previously described, this helps support the clip 410, avoiding undue strain being applied to the tragus, and preventing the clip 410 falling out in the event that it becomes dislodged.

Figure 5A:
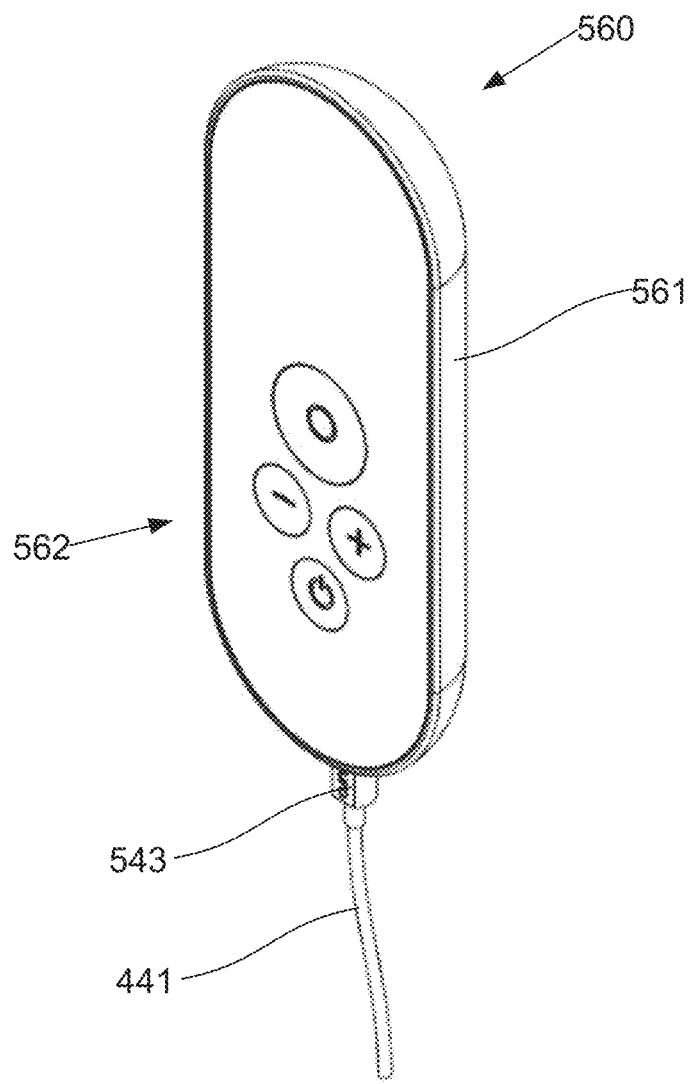
FIG. 5A is a schematic perspective view of an example of a control system.
Figures 5B, 5C:
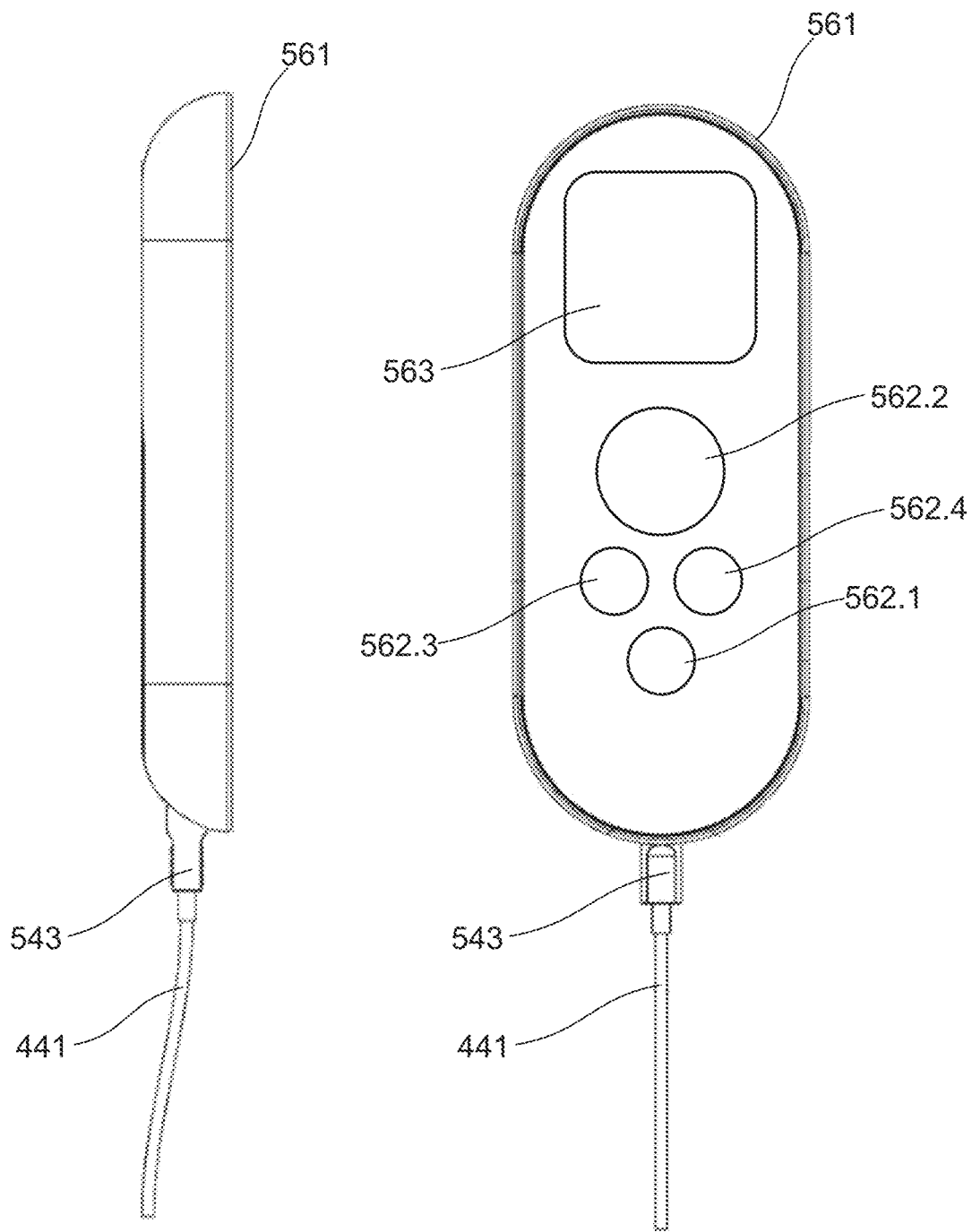
FIG. 5B is a schematic side view of the control system of FIG. 5A.
FIG. 5C is a schematic plan view of the control system of FIG. 5A.

A specific example of a control system form factor is shown in FIGS. 5A to 5C.

In this example, the control system includes a body 561, input buttons 562 and a display 563. In this example, four input buttons 562 are provided, including a power button 562.1, mode button 562.2 and up and down buttons 562.3, 562.4 are shown, allowing users to select different modes and also indicate when a desired stimulation current has been reached. The display can be of any form, and could include LED or LCD displays or similar. These can be used to display operating information, such as details of selected operating modes, therapy signal parameters, information regarding a current therapy session, such as a duration, or the like.

The housing typically includes a connector socket, that receives a plug 543 attached to the lead 441, which extends to the clip 410, as previously described. The plug and socket can be of any form, but in one example are USB or other similar connectors.

Figure 2:
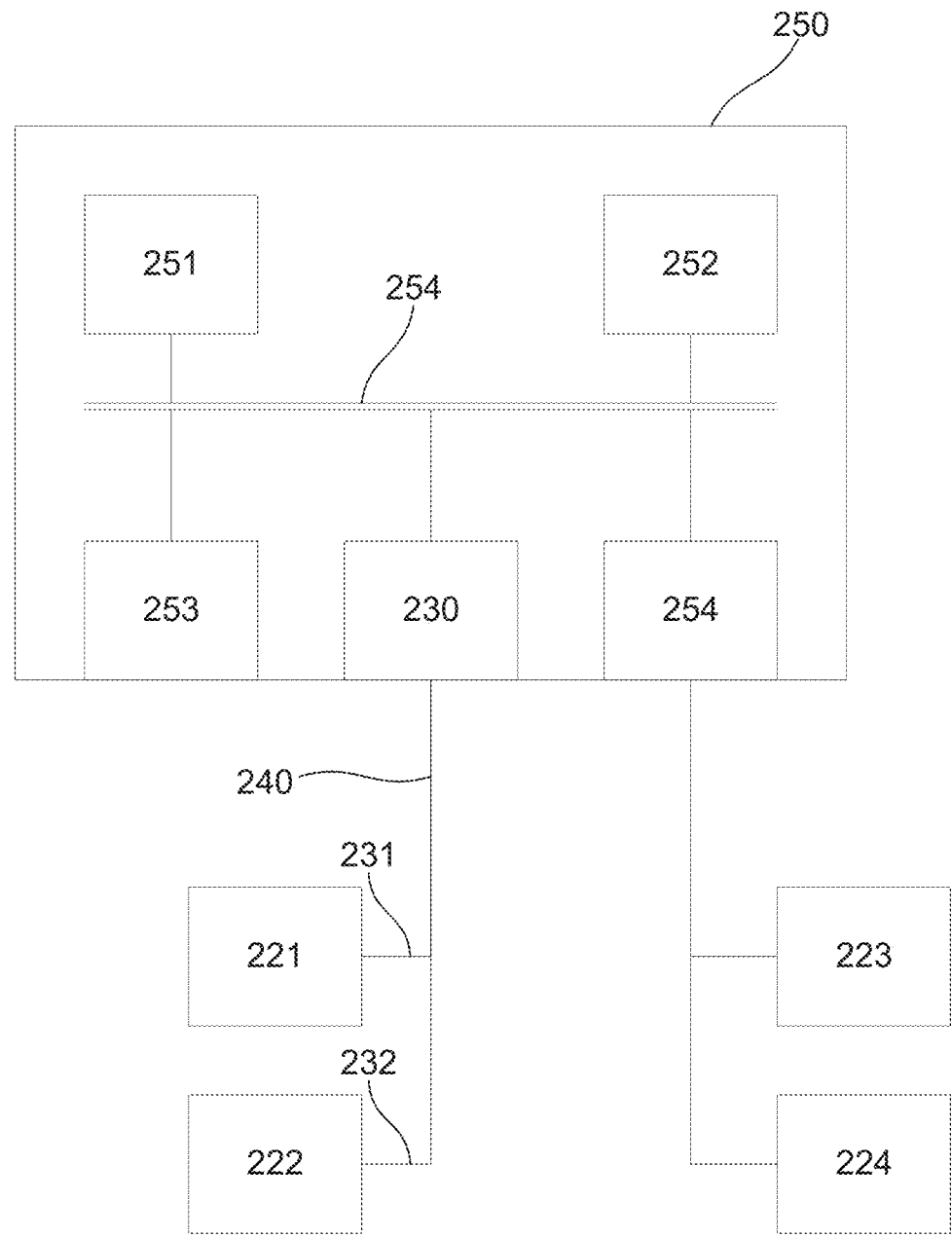
FIG. 2 is a schematic diagram of an example of a control system for the nerve stimulation system of FIG. 1A.
Figure 6:
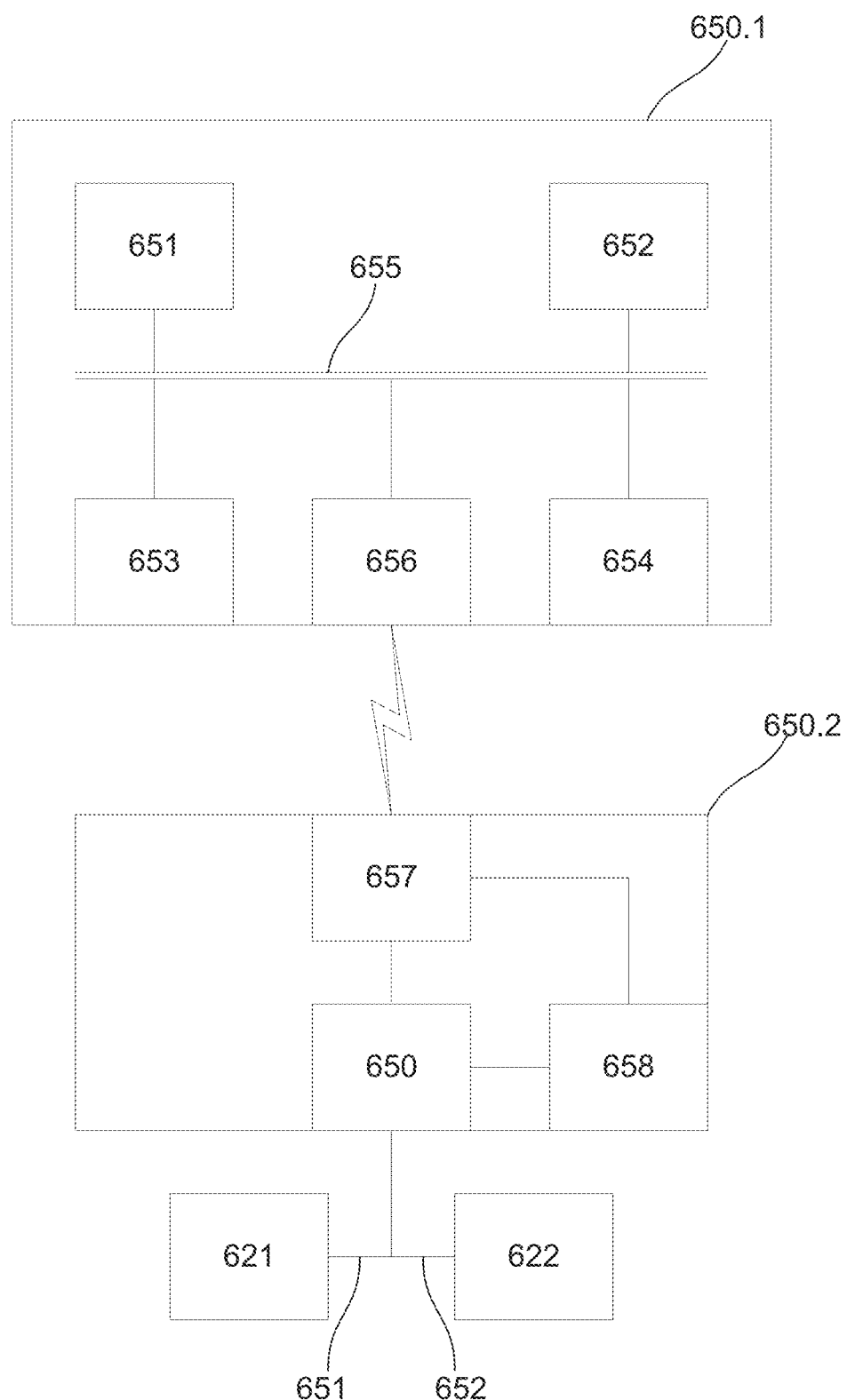
FIG. 6 is a schematic diagram of a second example of a control system for a nerve stimulation system.
Figure 7:
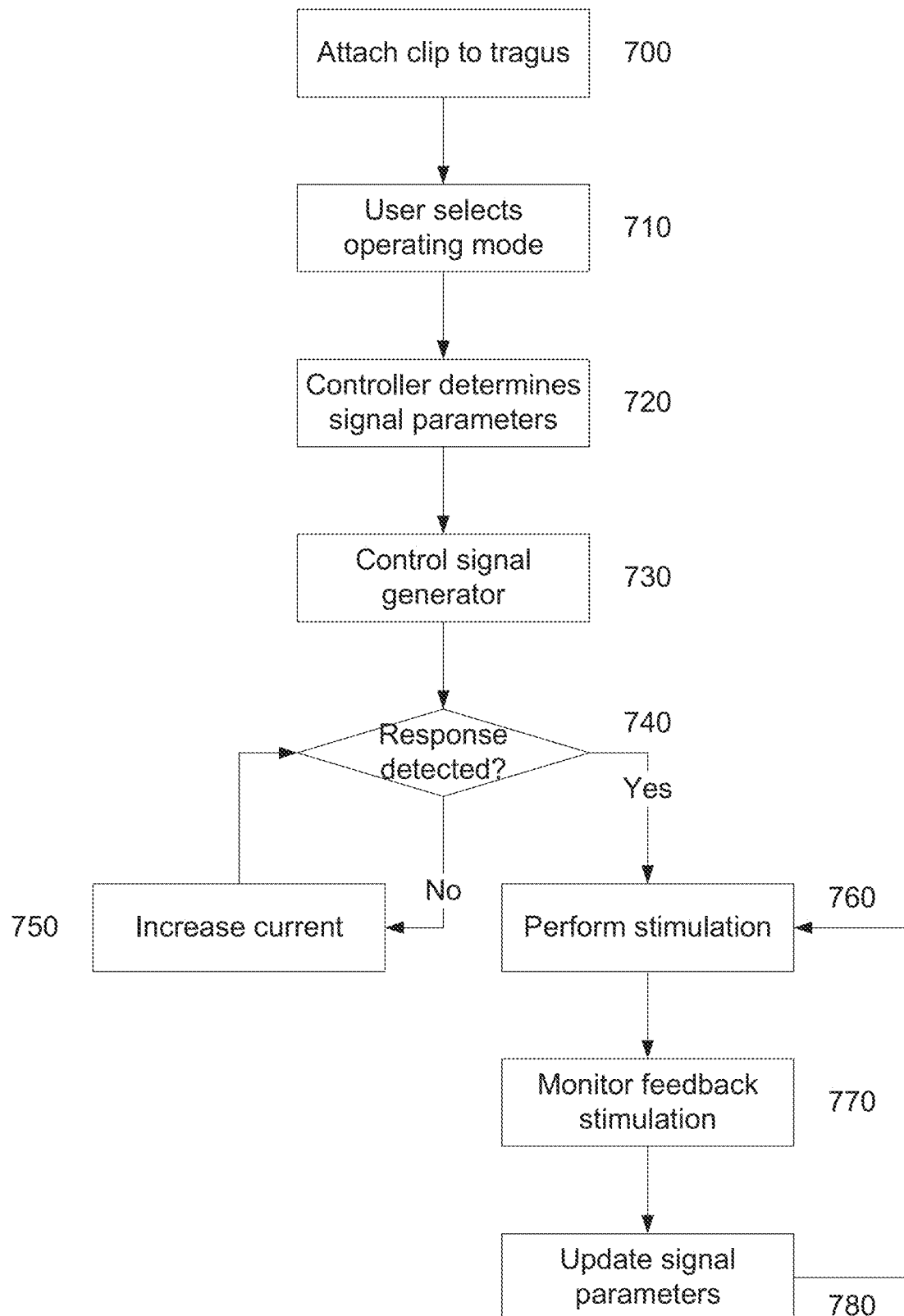
FIG. 7 is a flow chart of a specific example of a nerve stimulation process.

It will be appreciated that in one example, the internal components of the control system are generally similar to those shown in FIG. 2. An alternative example of an internal component arrangement will now be described with reference to FIG. 6.

In this example, the control system 650 includes a remote device 650.1, which includes a controller 651, a memory 652, an input/output device 653 and external interface 654 interconnected via a bus 656. In this example, a second external interface 656 is provided, which provides a short range wireless connection, such as Bluetooth™ or similar, to provide connectivity to an on-clip device 650.2, which is mounted on the clip 410. In this example, the second control system portion 650.2 includes an interface system on a chip (SoC) 657 and a signal generator 650, coupled to a power supply 658. The signal generator is again connected to electrodes 621, 622, via respective connections 651, 652.

This arrangement allows control signals to be provided from the remote device 650.1, to the on-clip device 650.2, and hence the signal generator 650, so that the signal generator can be controlled remotely. In one example, the remote device 650.1 could have a form similar to that shown in FIGS. 5A to 5C. However, it will be appreciated that as the remote device need only generate control signals, this could be achieved using any suitable processing system, and could be performed using a client device, such as a tablet, smart phone, or similar. It will also be appreciated that control using a device such as a tablet, smart phone, or similar could be used in conjunction with other physical designs of clip. For example, this could include providing the signal generator in a clip without the hook section, so that this minimises the size of the clip device providing a form factor similar to an earbud, and further allowing this to be controlled remotely using a smart phone, to thereby minimise the form factor of the wearable component of the system.

A further example of a stimulation process will now be described.

In this example, at step 700, the clip 410 is attached to the tragus by having the user bias the arms apart, position the arms on either side of the tragus and release the arms, as previously described.

At step 710, the user utilises the mode input button 522.2 to select an operating mode, allowing the controller 251 to retrieve therapy signal parameters from the memory 252, which are defined for the respective operating mode selected, at step 720. The therapy signal parameters are used to control the waveform of the therapy signals that are generated, and include parameters such as the pulse waveform shape, pulse duration, signal magnitude, signal frequency, or the like.

Example waveforms will now be described in more detail with reference to FIGS. 8A to 8F.

Figure 8A:
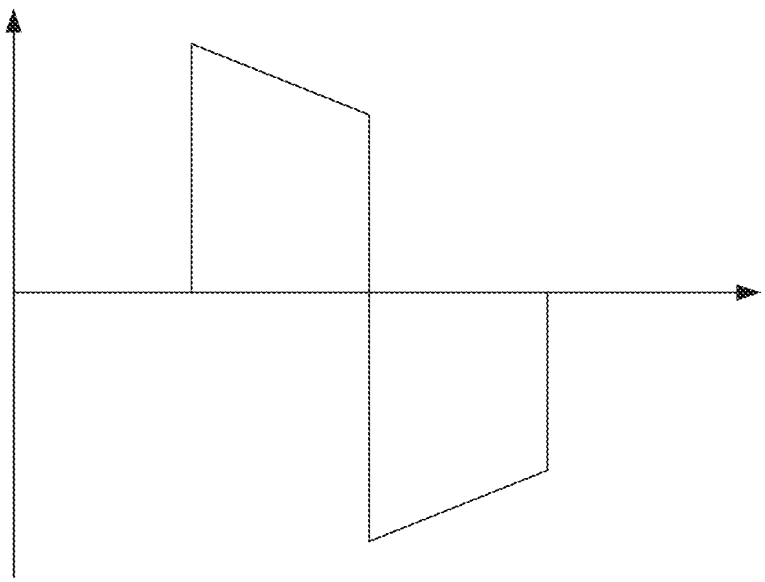
FIGS. 8A to 8M are schematic diagrams of example therapy signal waveforms.
Figure 8B:
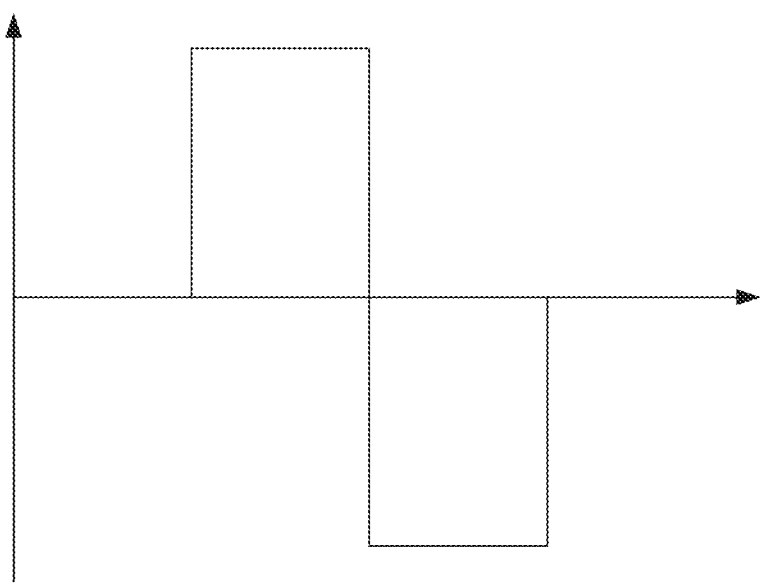

In the example of FIGS. 8A and 8B, the waveform are generally rectangular, with the signal of FIG. 8A including a ramped decay, which can arise from the discharge of capacitors used to generate the pulse waveform. The waveform is generally bi-phasic, including positive and negative components, and is symmetrical, so the magnitude of the positive and negative components are equal, thereby ensuring that the surface of the tragus is neutrally charged at the end of each pulse in the pulse sequence, which helps prevent charge build up, which can in turn mask the field generated by the applied therapy signals and hence reduce signal effectiveness, and overall efficacy. Additionally, charge build-up can also increase the risk of thermal burns or other discomfort.

Figure 8C:
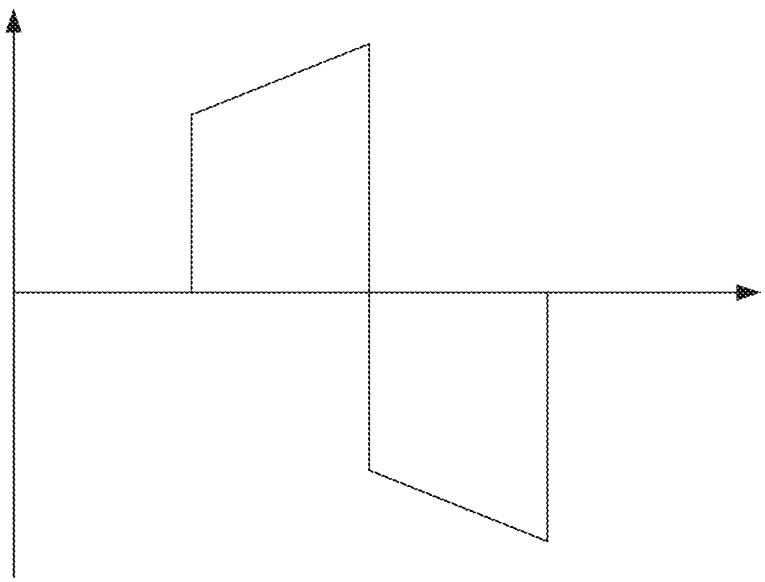
Figure 8D:
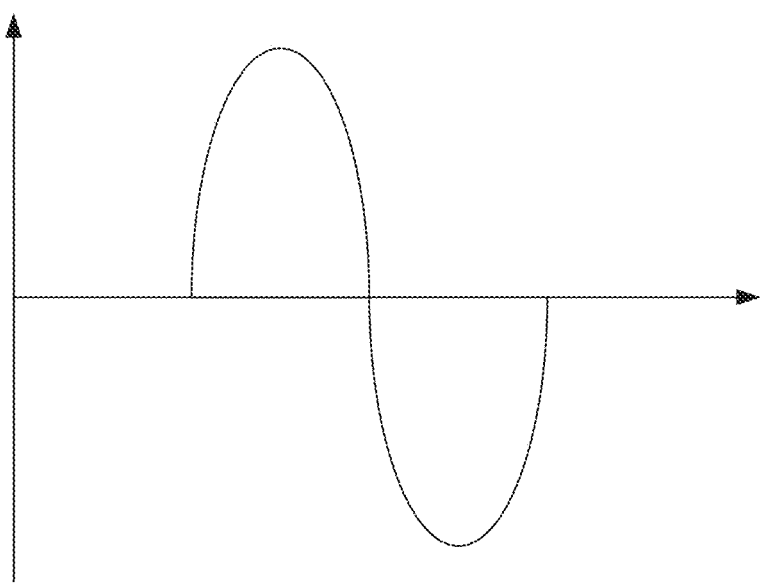

It will be appreciated that different shapes could be used however, as shown in FIGS. 8C and 8D, which shows a ramped increase in signal magnitude in a rectangular pulse waveform, and a sine waveform respectively. The use of gradually increasing waveforms of this type can assist in avoiding a sudden application of a current to the subject, which can avoid some of the discomfort associated with electrical stimulation.

Figure 8E:
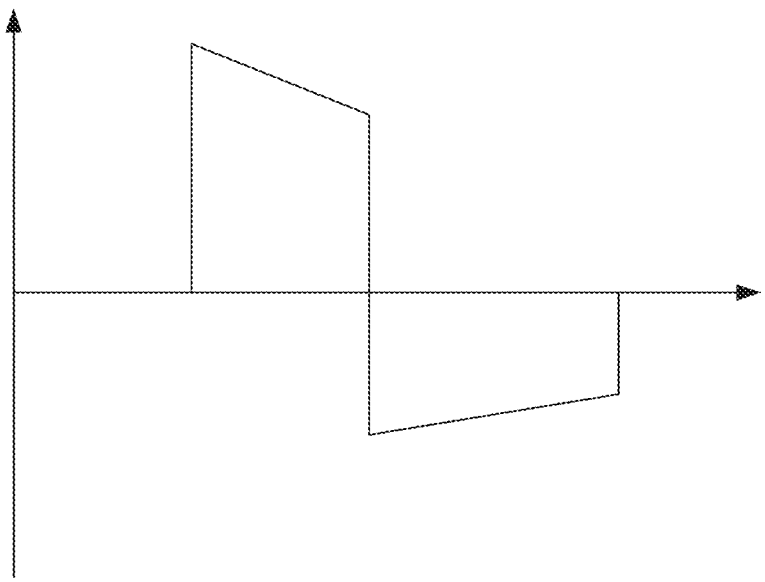
Figure 8F:
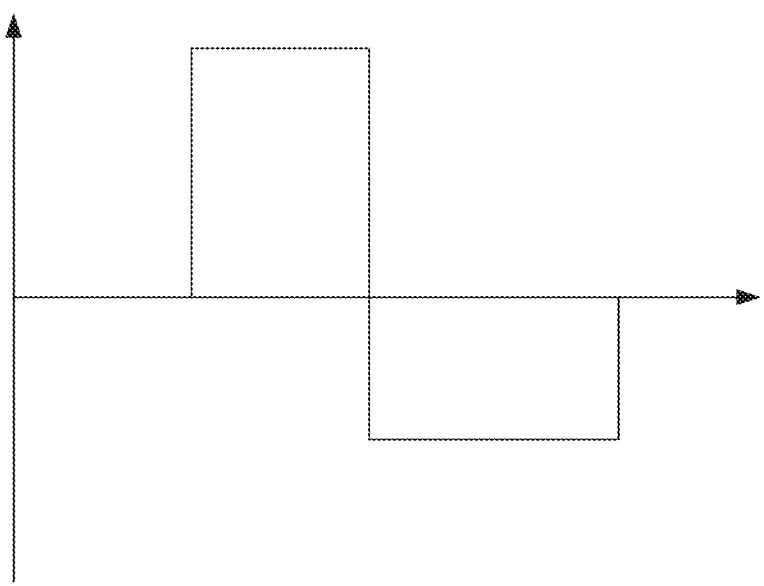

Alternative example waveforms are shown in FIGS. 8E and 8F. In this example, signals are again bi-phasic, but non symmetrical, meaning the magnitude of the waveform is unequal in the positive and negative phases. In this instance, this can result in generation of a net charge in the subject. However, this can be mitigated by having the waveform include an unequal duration in the positive and negative phases, thereby ensuring equal discharge and charging occurs, even though the signal magnitude differs.

Figure 8G:
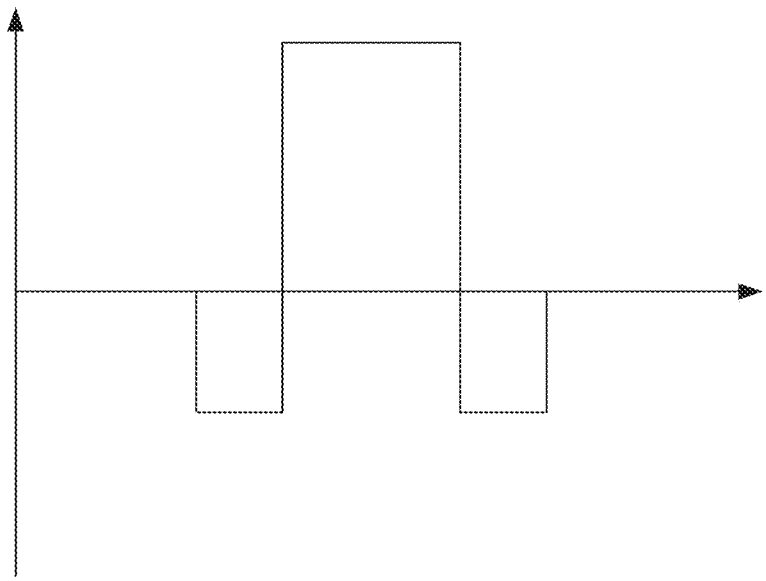

FIG. 8G shows a tri-phasic waveform, including two negative pulses and an intervening positive pulse. In this example, the sum of the negative phases is equal to the positive phase, to thereby minimise charge build-up. Furthermore, the preceding negative phase introduces a negative charge in the tissue prior to application of the positive phase, allowing the positive phase to have a greater magnitude without risk of causing thermal burns.

Figure 8H:
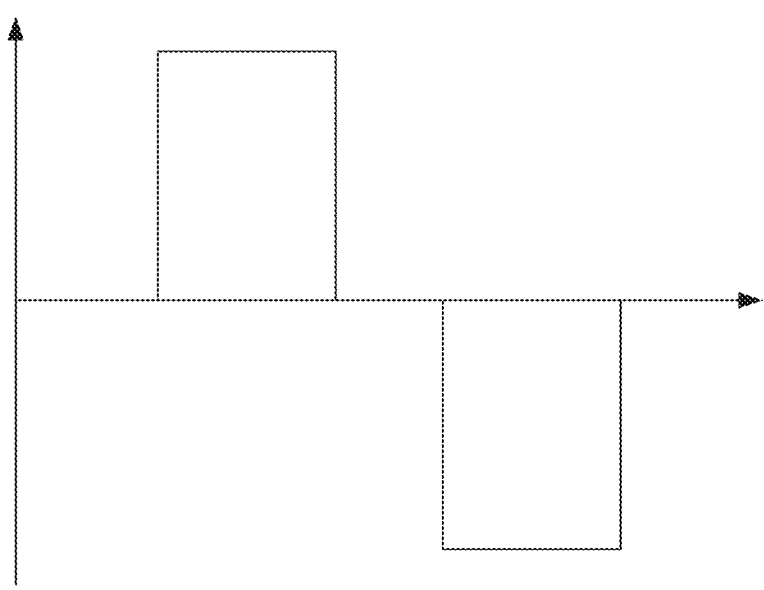
Figure 8I:
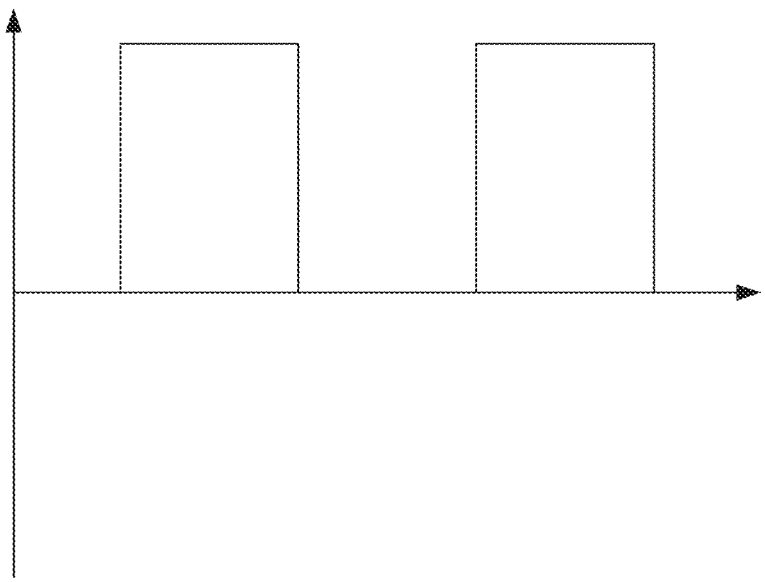

FIG. 8H shows an arrangement in which a dwell in the form of an interphase gap is introduced between phases, which can allow for some charge to remain in place before being actively discharged, which can help efficacy. This can also be implemented with mono-phasic pulses, as shown in FIG. 8I.

Figure 8J:
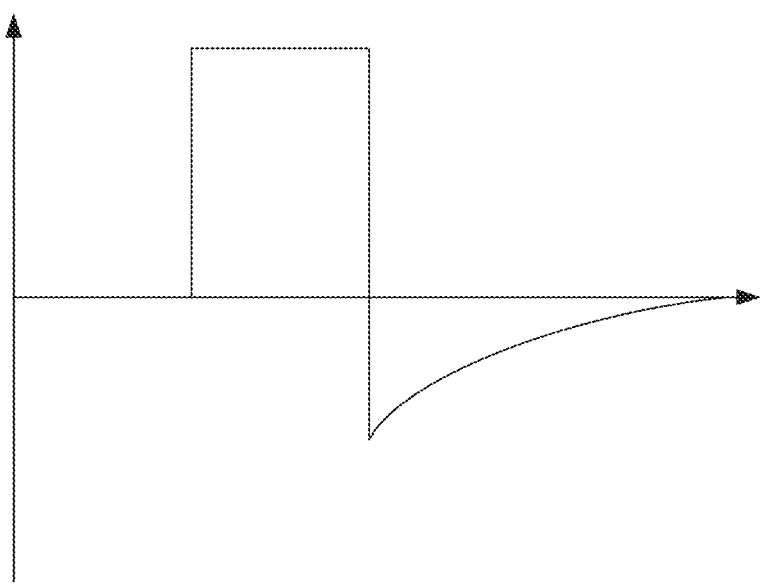
Figure 8K:
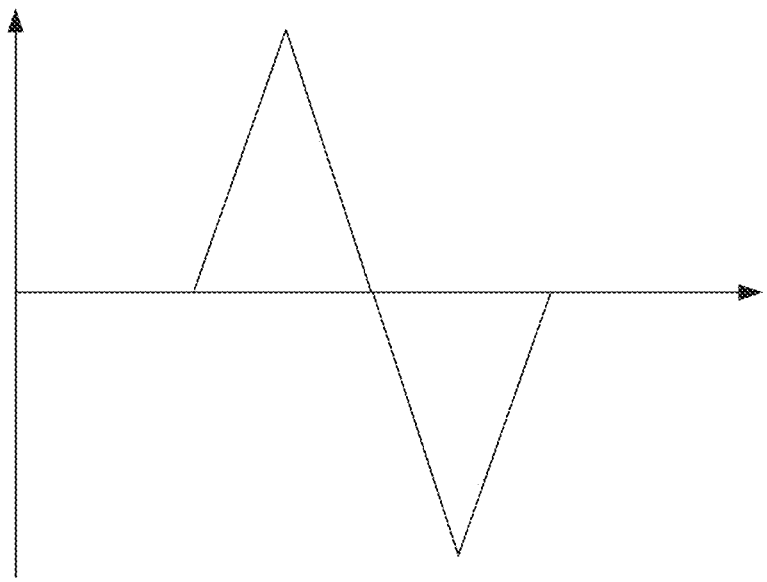

FIG. 8J illustrates asymmetric bi-phasic signals, in which each phase has a different waveform shape, whilst FIG. 8K shows a sawtooth waveform.

Figure 8L:
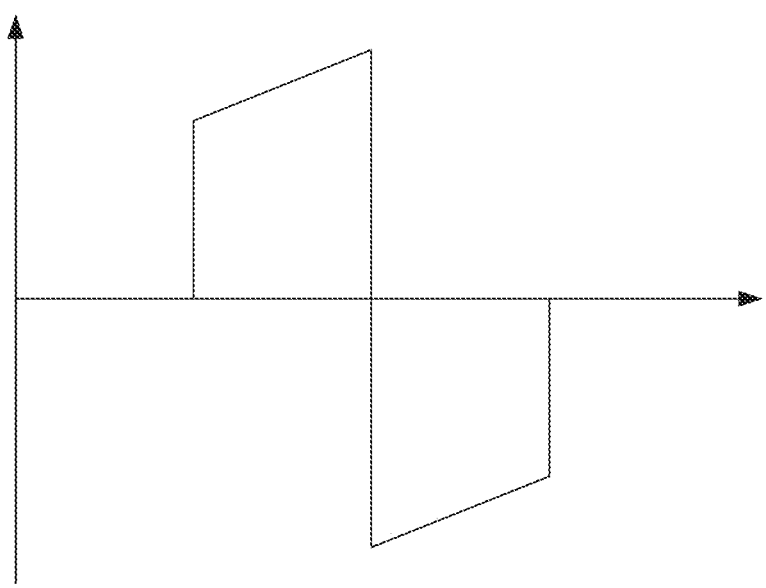
Figure 8M:
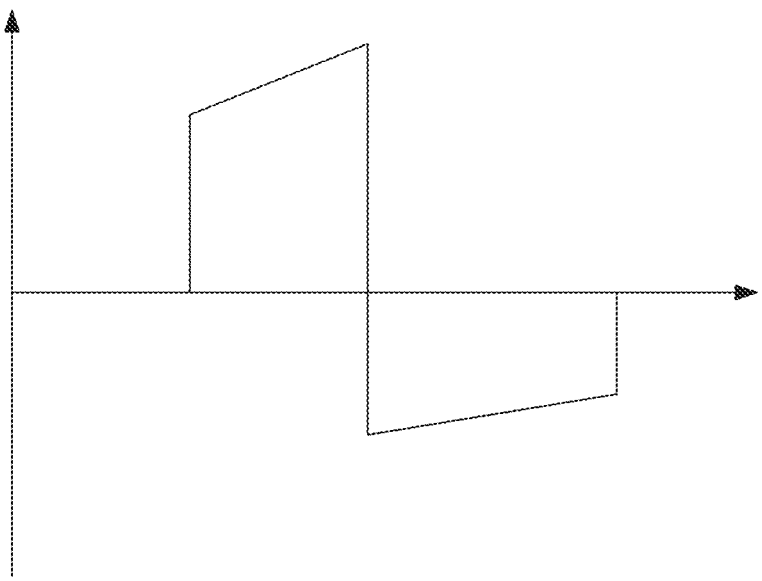

FIGS. 8L and 8M show variations on the waveforms of FIGS. 8A and 8E, albeit with a ramped increase in signal magnitude during the initial phase of the waveform.

It will be appreciated from the above that a wide range of different signal waveforms can be used and the above are for the purpose of example only and are not necessarily intended to be limiting.

Thus, signals can include mono-phasic, single phase, unidirectional pulse from baseline to either positive or negative. This should not be confused with Direct Current (DC), in that whilst one electrode is always positive and one electrode is always negative, pulsed mono-phasic waves have interruptions, use shorter duration pulses, and less strength than DC. As a result, monophasic waveforms do not cause the same magnitude of chemical changes as DC, and are less likely to lead to discomfort or thermal burns.

Signals can be bi-phasic, including two phases, with one positive phase and one negative phase so that the electrodes change polarity. The phases can be symmetrical so that identical phases cancel each other out, or asymmetrical, with non-identical phases either balanced with no net charge or unbalanced yielding a net charge.

Finally, more broadly, poly-phasic signals, such as tri-phasic signals could be used, with three or more phases in bursts. Again phases can be symmetrical or asymmetrical and may be separated by interphase gaps.

It will also be appreciated that therapy signal parameters may vary throughout a stimulation sequence, for example so that a magnitude, frequency, pulse width and/or waveform varies during a single stimulation session, which can last for several minutes or up to or more than an hour.

Having determined the signal parameters, the controller 251 uses the therapy signal parameters to generate control signals, which are supplied to the signal generator 230 to thereby control the signal generator 230 at step 730. Initially, this will cause the signal generator 230 to generate a low magnitude therapy signal, which is applied to the subject via the electrodes 221, 222, allowing the subject to assess if they can perceive the signal and/or whether the signal is causing discomfort.

If no response is detected at step 740, the current is increased in 1 mA increments at step 750, and the process repeated until a response is detected (or until a threshold signal magnitude is reached), with this being indicated by the user through activation of one of the input buttons 562.

Once a response is detected (or a threshold magnitude reached) at step 740, the therapy signal magnitude is set and stimulation sequence is performed at step 760. As previously described, the stimulation sequence is typically defined by the selected operating mode, and may involve applying varying therapy signals over a period of time. One example of this is if the device is operating in research mode, in which case the stimulation signals are ramped down progressively so that the stimulation session does not apply significant active stimulation, allowing this to act as a control to assess the effectiveness of a stimulation sequence applied to other subjects.

Once stimulation has commenced, the system can optionally monitor feedback at step 770, for example by having the controller 251 monitor signals from one or more sensors 223, and use this to determine a value of or changes in a subject parameter, or by monitoring user input commands received via an input button 562. The feedback can then be used to ascertain an effectiveness of the therapy signals and further alter the signals if required, for example by modifying the therapy signal parameters to alter a magnitude, waveform shape, intensity, magnitude, or the like, at step 780. The process can then return to step 760 allowing the modified therapy signals to be applied, repeating this process until the therapy is complete.

In one example, the system is also capable of being used to treat depression. In this regard, it has been shown that inflammation causes depressive symptoms and reductions in inflammation can have antidepressant effects. Vagus nerve stimulation can impact the cholinergic anti inflammatory pathway and a study (Stavrakis, S., Stoner, J. A., Humphrey, M. B., Morris, L., Filiberti, A., Reynolds, J. C., . . . & Varahan, S. (2020). TREAT AF (transcutaneous electrical vagus nerve stimulation to suppress atrial fibrillation): a randomized clinical trial. JACC: Clinical Electrophysiology Volume 6, Issue 3, March 2020, Pages 282-291) performed using the above described arrangement to perform tragus based vagus nerve stimulation showed significant reduction in the inflammatory biomarker TNF alpha. Further, the study demonstrated that stimulation of the vagus nerve activates the parasympathetic nervous system which has antiadrenergic effects which can be stress relieving, allowing the vagus nerve stimulation approach to be used to treat stress, depression and other related mental health disorders.

In another example, the system is used to treat Atrial Fibrillation (AF). An example study (Stavrakis, S., Stoner, J. A., Humphrey, M. B., Morris, L., Filiberti, A., Reynolds, J. C., . . . & Varahan, S. (2020). TREAT AF (transcutaneous electrical vagus nerve stimulation to suppress atrial fibrillation): a randomized clinical trial. JACC: Clinical Electrophysiology Volume 6, Issue 3, March 2020, Pages 282-291) to assess the effectiveness of tVNS was performed using the above described arrangement to non-invasively stimulate vagal fibres, for example, to activate anti-adrenergic or anti inflammatory pathways, to perform autonomic modulation, for example to reduce sympathetic nervous system activity, or the like.

Figure 9:
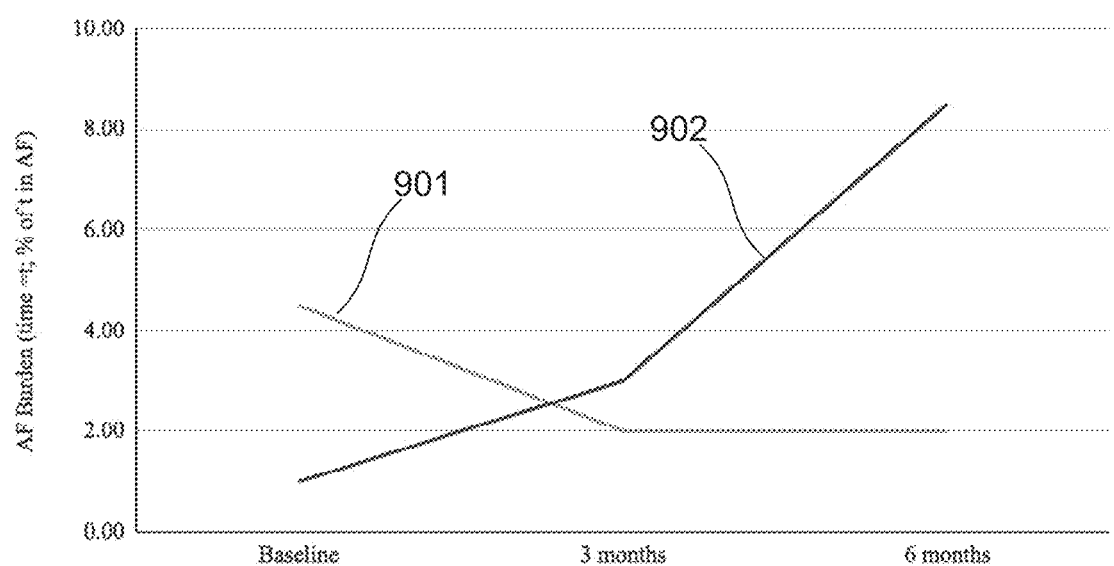
FIG. 9 is a graph illustrating the effect of stimulation on atrial fibrillation burden; and, FIG. 10 is a graph illustrating the effect of stimulation on symptoms of myalgic encephalomyelitis.

In this study, the primary outcome of median Atrial Fibrillation burden was reduced as shown in FIG. 9, which is a graph showing the effects of tragus based stimulation on AF 901 versus the sham 902. The data are presented as median and interquartile range. The p value is based on a comparison of median AF burden levels at the 6-month time point after adjusting for baseline measures. The total duration of AF at 6 months was 83% lower in the active arm compared with the control arm. Considering the patients with non zero AF burden at baseline, 47% of patients in the active group compared to 5% in the control group experienced a >75% reduction in AF burden during follow up (p=0.003).

Cytokine levels, specifically Serum TNF alpha, also significantly decreased in active relative to control group by 23%. There was no significant effect of active compared with sham stimulation on heart rate which supports the low risk profile of this device in the target population.

The clinical study results show a significant improvement in the primary outcome measure (reduction in AF burden), demonstrating statistically significant clinical improvement in the patient population, with no device related adverse events reported.

Another point to note is that vagus nerve stimulation (VNS) was initially used to induce AF, however, this low level stimulation using the above described device has been shown to suppress AF. Stimulation at the tragus preferentially activates afferent rather than efferent vagal fibres, leading to parasympathetic activation, providing an advantage over cervical and invasive VNS and resulting in the anti adrenergic effects reducing AF burden.

Thus the study fulfilled it's primary outcome criteria and showed that chronic, intermittent, transcutaneous electrical stimulation of the auricular branch of the vagus nerve at the tragus, using the above arrangement, suppressed AF in patients with paroxysmal AF over a 6-month period. The importance of the findings of the trial are highlighted by recent evidence that lower AF burden over a 2-week monitoring period is associated with a lower risk of ischemic stroke, independent of known stroke risk factors in patients with paroxysmal AF. Thus, the results support other evidence that stimulation of either the cervical vagus nerve or the tragus is able to suppress AF and reverse atrial electrical and autonomic remodeling.

Further studies on the use of tVNS in treating atrial fibrillation have demonstrated other benefits including suppression of atrial fibrillation (Stavrakis, S., Humphrey, M. B., Scherlag, B. J., Hu, Y., Jackman, W. M., Nakagawa, H., . . . & Po, S. S. (2015). Low-level transcutaneous electrical vagus nerve stimulation suppresses atrial fibrillation. Journal of the American College of Cardiology, 65(9), 867-875), ameliorating left ventricular strain in humans (Tran, N., Asad, Z., Elkholey, K., Scherlag, B. J., Po, S. S., & Stavrakis, S. (2019). Autonomic neuromodulation acutely ameliorates left ventricular strain in humans. Journal of cardiovascular translational research, 12(3), 221-230) and suppression of post-operative atrial fibrillation and inflammation (Stavrakis, S., Humphrey, M. B., Scherlag, B., Iftikhar, O., Parwani, P., Abbas, M., . . . & McUnu, A. (2017). Low-level vagus nerve stimulation suppresses post-operative atrial fibrillation and inflammation: a randomized study. JACC: Clinical Electrophysiology, 3(9), 929-938).

Additionally, the research has demonstrated that for humans with atrial fibrillation, the discomfort threshold is approximately 60% of the bradycardia threshold, while stimulation at 50% of the bradycardia threshold resulted in a significant decrease in inflammatory cytokines and atrial fibrillation duration. In particular, low level cervical VNS has demonstrated antiarrhythmic effects, attributed to the antiadrenergic effects, specifically, tVNS has been shown to activate central vagal projections in the brain in humans resulting in decreased sympathetic output. Transcutaneous VNS may offer clinical advantages over cervical VNS because tVNS preferentially activates afferent rather than efferent vagal fibers. Cervical VNS may inadvertently result in stimulation of sympathetic fibers, colocalized with vagal fibers in the vagus nerve. tVNS however may induce minimal or no concomitant sympathetic stimulation, through a preferential activation of afferent vagal fibres thus reducing sympathetic output. This can help achieve the 'neural fulcrum' where afferent and efferent branches of the vagus nerve are activated in a way that results in a neutral HR response (but still elicits favourable changes to HRV).

The system can also be used to provide treatment in respect to heart failure. Specifically, it has been demonstrated that stimulation at the tragus preferentially improves endothelial function in patients with heart failure with reduced ejection fraction, acutely ameliorates diastolic dysfunction in humans and acutely ameliorates left ventricular strain in humans. Thus tragus based tVNS has cardioprotective mechanisms and also lowers Global longitudinal strain (GLS). Studies have also demonstrated other benefits, including improved endothelial function (Dasari, T. W., Gabor, F., Csipo, T., Palacios, F. S., Yabluchanskiy, A., Samannan, R., & Po, S. (2018). Non-invasive Neuromodulation of Vagus Activity Improves Endothelial Function in Patients with Heart Failure with Reduced Ejection Fraction: A Randomized Study. Journal of Cardiac Failure, 24(8), S59-S60) and ameliorated diastolic function (Stavrakis, S., Tran, N., Asad, Z., & Po, S. S. (2017). P2437 Low level transcutaneous vagus nerve stimulation acutely ameliorates diastolic function in humans. European Heart Journal, 38 (suppl_1)).

Additionally, improvement in cardiac mechanics with tVNS is proportionate to autonomic function improvement, which can in turn be measured using an LF/HF HRV ratio, allowing improvements in cardiac function to be quantified.

Traumatic Brain Injury (TBI) causes neuroinflammation and consequently many negative side effects associated with inflammation of the brain. tVNS has neurorehabilitation effects likely based on its effects on cortical plasticity. A recent study using the above arrangement (Noé, E., Ferri, J., Colomer, C., Moliner, B., O'Valle, M., Ugart, P., . . . & Llorens, R. (2020). Feasibility, safety and efficacy of transauricular vagus nerve stimulation in a cohort of patients with disorders of consciousness. Brain Stimulation: Basic, Translational, and Clinical Research in Neuromodulation, 13(2), 427-429) demonstrated a mild improvement in some patients. Thus, the above described device can be used in treating TBI, consciousness disorders and other neurological conditions.

Inflammatory and other autoimmune diseases can benefit from novel non-pharmacological anti inflammatory interventions. Traditional pharmacological anti inflammatory options have many undesirable side effects, whereas tVNS is low risk with few side effects and no drug interactions. The above mentioned studies have demonstrated a significant reduction in inflammatory biomarkers, which confirm the activation of Cholinergic Antiinflammatory Pathway (CAP).

There is also significant evidence that tVNS can improve learning and memory, and hence the above described arrangement can also be used for cognitive enhancement (see: "Vagus nerve stimulation improves working memory performance" Lihua Sun, Jari Peräkylä, Katri Holm, Joonas Haapasalo, Kai Lehtimäki, Keith H. Ogawa, Pages 954-964 I Received 9 Sep. 2016, Accepted 16 Jan. 2017, Published online: 19 Feb. 2017). A study (Effect of Transcutaneous Vagus Nerve Stimulation on Sports Performance by Kyle Lindley, ARIZONA STATE UNIVERSITY May 2019) has also shown the ability of improving performance and aiding neurophysiological recovery in athletes. Accordingly, it will be appreciated that the above described system can be used to enhance cognitive and sporting performance.

Neuromodulation, and hence by extension, the above system, can also be used in treating disease states, particularly those associated with systemic inflammatory shock caused by the body's response to a virus or other infection (also known as cytokine storm), such as Coronavirus and other similar conditions (Implications for Neuromodulation Therapy to Control Inflammation and Related Organ Dysfunction in COVID-19 by Marat Fudim & Yawar J. Qadri &

Kamrouz Ghadimi & David B. MacLeod & Jeroen Molinger & Jonathan P. Piccini & John Whittle & Paul E. Wischmeyer & Manesh R. Patel & Luis Ulloa, Journal of Cardiovascular Translational Research 26 May 2020). In this regard, anti Inflammatory drugs have been found to be helpful in treating Covid, and a further study has shown positive results (The Use of Non-invasive Vagus Nerve Stimulation to Treat Respiratory Symptoms Associated With COVID-19: A Theoretical Hypothesis and Early Clinical Experience by Peter Staats, Georgios Giannakopoulos, Justyna Blake, Eric Liebler and Robert M. Levy).

Figure 10:
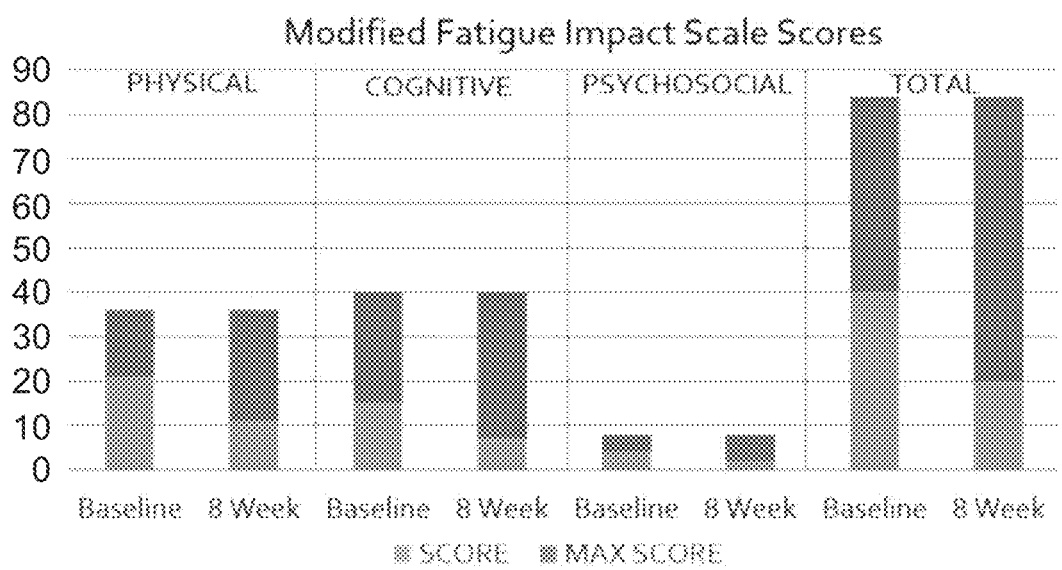

Analogously, the system can be used to treat other post viral conditions, including ME/CFS "Post viral syndrome". One cause of such conditions is believed to be from a small localised infection of the vagus nerve which causes an exacerbated infection response without a real threat from infection, causing fatigue and depressive symptoms (Chronic fatigue syndrome from vagus nerve infection: A psychoneuroimmunological hypothesis by Michael B. VanElzakker, Medical Hypotheses Volume 81, Issue 3, September 2013, Pages 414-423). Further research performed using tVNS has also demonstrated a reduction in fatigue scores, using the modified fatigue impact scale (MFIS), as shown in FIG. 10.

An early stage clinical trial showing effects of VNS on Radiotherapy-induced Inflammation is showing promising results with the patients demonstrating a reduction of immune suppressing and pro-tumoral MDSC cells and an enhancement of anti-cancer immune cells.

tVNS has also been shown to reduce the effects of PTSD-related fear extinction learning in patients (Transcutaneous Cervical Vagal Nerve Stimulation Blocks Sympathetic Responses to Stress in Posttraumatic Stress Disorder by Nil Z. Gurel, MS, Matthew T. Wittbrodt, Hewon Jung, Mobashir H. Shandhi, Emily G. Driggers, Stacy L. Ladd, Minxuan Huang, Yi-An Ko, Lucy Shallenberger, Joy Beckwith, Jonathon A. Nye, Bradley D. Pearce, Viola Vaccarino, Amit J. Shah, Omer T. Inan, J. Douglas Bremner).

Research is also being performed regarding the impact of tVNS on Fibromyalgia, whilst a trial is underway to demonstrate the effectiveness of Vagus Nerve Stimulation in Treatment of Postural Orthostatic Tachycardia Syndrome (POTS).

Finally, the technology is also being used in reducing the size of myocardial injury induced by ischemia (Yu, L., Huang, B., Po, S. S., Tan, T., Wang, M., Zhou, L., . . . & Wang, Z. (2017). Low-level tragus stimulation for the treatment of ischemia and reperfusion injury in patients with ST-segment elevation myocardial infarction: a proof-of-concept study. JACC: Cardiovascular Interventions, 10(15), 1511-1520).

Accordingly, the above described arrangements provide a system suitable for performing non-invasive vagus nerve stimulation utilising a clip that is configured to be positioned on a tragus of a subject.

The above arrangement can provide a number of benefits, such as avoiding the risk of nerve damage as can occur with cervical VNS, avoiding the risk of stimulating carotid artery as can occur with cervical VNS & cervical nVNS or avoiding uncomfortable side effect of 'lip pull' as can arise with cervical nVNS, and avoid the chance of thermal burns.

In one example, the system employs target stimulation of the nerve via electrodes provided in a spaced substantially parallel arrangement, which provides for easier nerve excitation by allowing a greater overall electric field to be generated, whilst avoiding excessive current densities on a tissue surface.

In contrast to a number of other non-invasive techniques, the current system operates by stimulating the vagus nerve in the tragus, and specifically the inner and outer tragus, which contains longer vagal nerve fibres for greater chance of eliciting action potentials within the nerve. This improves the effectiveness of stimulation, whilst minimising the currents needed to achieve an action potential, thereby avoiding discomfort.

The above described arrangement uses a clip to urge the electrodes against the tissue surface. This allows for the electrodes to be urged against the tragus with an optimised pressure, which can assist in overcoming skin impedance while not causing pain or penetrating the skin. Furthermore, this helps ensure a consistency of delivery of electric current, which ensures consistent excitation to the nerve, which is important to ensure efficacy in some therapies.

The above described arrangements can use a variety of different therapy signal waveforms, which can ensure optimal nerve excitation and maximise the creation of action potentials, while avoiding the need to apply signals that cause pain to the user.

In one example, the system is configured to apply asymmetrical balanced bi-phasic square waveforms, which can be better tolerated by users with less chance of causing a pain response and can be more effectively focused to specific nerve fibres. Additionally and/or alternatively, symmetrical balanced biphasic square waveforms can be used to reduce charge build-up, thereby resulting in reduced skin irritation for the user.

In one example, the above described apparatus can be used to record physiological measures for biofeedback, such as Heart Rate, Heart Rate Variability, Galvanic Skin Response, ECG, inflammatory biomarkers, or the like. This can be achieved by employing measuring apparatus on skin contacting points on or around the electrode.

Such biofeedback can then be used to deliver optimal stimulation, with therapy signal parameters, such as stimulation intensity, waveform and frequency being adjusted in real time to achieve the optimal outcome of physiological autonomic balance and/or immunological balance.

In one example, through appropriate configuration, the above described arrangement can overcome skin resistance, whilst avoiding the creation of pain. The system can effectively target vagus nerve fibres, and can sustain an electrical field around the target nerve fibre. The use of the clip can hold the electrodes in place during use and ensure a stable pressure and consistent electrical contact between the skin and electrode, in turn leading to more stable contact impedance and hence applied current and resulting stimulation.

In one example the system employs a lead including an overmould with soft plastic outer layer with thin wire central layer for retaining shape of ear. This section covers standard insulating cable containing anode/cathode cores, and can assist in distributing loads and helps retain the clip in place, allowing for the more consistent application of therapy signals.

It will be appreciated that the above described approach contrasts to traditional invasive VNS, which has to be surgically implanted, administered by a doctor and is irreversible. Specifically, the device can be administered non-invasively, without the need for surgery, and can be applied directly to the outer skin. The device can be operated by the individual without the need for assistance by a doctor and can be applied or removed from the individual at any time without any additional risks.

Other devices that target non-invasive stimulation of the vagus nerve typically need to be manually held in place to deliver stimulation and use methods of stimulating across the skin which doesn't penetrate effectively.

In contrast the current arrangement is designed to attach to the ear to deliver effective stimulation, and furthermore, stimulates either side of the skin of the tragus to deliver a more concentrated current to the target nerve.

Other devices also typically need to be manually guided to the appropriate stimulation site, whereas the above described system guides the electrode plates to the location that will deliver stimulation to the part of the skin directly above the vagal innervation, whilst avoiding stimulation at a site that is in close proximity to the carotid artery, which can result in adverse outcomes.

The above arrangements avoid a high risk of skin irritation arising from small surface area of electrodes which yield a higher relative current density. In contrast the above arrangements use a larger surface area of electrodes which disperses current which leads to less risk of skin irritation or thermal burns.

In the above examples, the nerve stimulation system is described as including a securing member in the form of a clip, including spaced apart arms are provided that can be biased together at distal ends. However, it will be appreciated that other securing members could be used that are capable of securing electrodes to the tragus, and the term securing member should be considered to encompass non-clip based arrangements.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A nerve stimulation system for stimulating a vagus nerve in a biological subject, the system comprising:
   a) a securing member configured to be attached to the subject;
   b) a signal generator electrically connected to electrodes, the signal generator being configured to generate at least one therapy signal that is configured to be applied to the vagus nerve via the securing member electrodes, to thereby modulate the vagus nerve of the subject for treating atrial fibrillation; and,
   c) a controller being configured to:
      i) cause the signal generator to generate progressively changing therapy signals having progressively changing therapy signal parameters;
      ii) monitor a heart rate of the subject;
      iii) detect changes in heart rate whilst the therapy signal parameters change;
      iv) set a therapy signal parameter threshold based on one of the therapy signal parameters of the therapy signal when the changes in heart rate are detected; and,
      v) cause the signal generator to generate therapy signals based on the therapy signal parameter threshold to thereby modulate the vagus nerve of the subject for treating atrial fibrillation.

2. The nerve stimulation system of claim 1, wherein the securing member is configured to be attached to at least one of:
   a) a tragus of the subject;
   b) an ear of the subject; and,
   c) proximal to the vagus nerve of the subject.

3. The nerve stimulation system of claim 1, wherein the securing member comprises a clip comprising:
   a) opposing arms configured so that a distal end of the arms are biased towards each other; and,
   b) electrodes positioned proximate a distal end of the arms on opposing faces so that the electrodes are urged into engagement with the subject.

4. The nerve stimulation system according to claim 3, wherein the system comprises a hook being configured to extend over and behind an ear of the subject to at least partially support the clip.

5. The nerve stimulation system according to claim 3, wherein the system comprises a lead extending from the clip, the lead comprising connections configured to electrically connect the electrodes to the signal generator.

6. The nerve stimulation system according to claim 3, wherein one of the arms is at least one of:
   a) configured to be positioned within a concha of the user; and,
   b) pivotally connected about a mid-portion.

7. The nerve stimulation system according to claim 3, wherein a distal ends of the arms are biased together using a biasing mechanism; wherein the biasing mechanism includes at least one of:
   a) a pivot;
   b) a spring;
   c) a rubber member;
   d) a malleable member interconnecting the arms;
   e) at least partially malleable arms;
   f) an at least partially elastic member interconnecting the arms;
   g) at least partially elastic arms; and
   h) magnets provided on the arms.

8. The nerve stimulation system according to claim 3, wherein at least one of:
   a) a proximal outer face of the arms comprise a depression configured to allow a subject to engage the arms and bias the arms apart;
   b) the arms have at least one of:
      i) a length that is one of:
         (1) greater than 15 mm;
         (2) greater than 16 mm;
         (3) greater than 17 mm;
         (4) greater than 18 mm;
         (5) greater than 19 mm;
         (6) greater than 20 mm;
         (7) greater than 21 mm;
         (8) less than 30 mm;
         (9) less than 28 mm;
         (10) less than 27 mm;
         (11) less than 26 mm;
         (12) less than 25 mm;
         (13) less than 24 mm;
         (14) less than 23 mm;
         (15) about 22 mm; and,
      ii) a width that is one of:
         (1) greater than 5 mm;
         (2) greater than 6 mm;
         (3) greater than 7 mm;
         (4) greater than 8 mm;
         (5) greater than 9 mm;

(6) greater than 10 mm;
(7) less than 16 mm;
(8) less than 15 mm;
(9) less than 14 mm;
(10) less than 13 mm;
(11) less than 12 mm;
(12) about 11 mm;
c) the electrodes are one of:
  i) substantially circular;
  ii) rounded rectangular;
  iii) rounded square;
  iv) at least partially dome shaped;
  v) have a diameter of one of:
    (1) greater than 4 mm;
    (2) greater than 5 mm;
    (3) greater than 6 mm;
    (4) greater than 7 mm;
    (5) less than 12 mm;
    (6) less than 11 mm;
    (7) less than 10 mm;
    (8) less than 9 mm; and,
    (9) about 8 mm;
d) a surface of the electrodes at least one of:
  i) is roughened;
  ii) comprises grooves;
  iii) comprises ridges; and,
  iv) is coated;
e) a surface of the electrodes is coated with at least one of:
  i) an inert metal; and,
  ii) gold;
f) a lead extending from the clip comprises at least one of:
  i) a respective conductor for each electrode;
  ii) at least one insulating layer; and,
  iii) a braided shield; and,
g) the signal generator is mounted on the clip.

9. The nerve stimulation system according to claim 3, wherein a respective therapy signal is applied to each of the electrodes; wherein the respective therapy signals are at least one of:
a) in phase; and,
b) out of phase.

10. The nerve stimulation system according to claim 1, wherein therapy signals are signals at least one of:
a) having a frequency that is one of:
  i) less than 20 kHz;
  ii) less than 10 kHz;
  iii) less than 1 kHz;
  iv) less than 500 Hz;
  v) less than 200 Hz;
  vi) less than 150 Hz;
  vii) less than 100 Hz;
  viii) less than 75 Hz;
  ix) greater than 1 Hz;
  x) greater than 2 Hz;
  xi) greater than 5 Hz;
  xii) greater than 10 Hz;
  xiii) greater than 20 Hz;
  xiv) about 20 Hz; and,
  xv) about 50 Hz;
b) having a pulse width of one of:
  i) less than 5,000 µs;
  ii) less than 2,500 µs;
  iii) less than 1,000 µs;
  iv) less than 500 µs;
  v) less than 200 µs;
  vi) less than 100 µs;
  vii) less than 75 µs;
  viii) greater than 1 µs;
  ix) greater than 2 µs;
  x) greater than 5 µs;
  xi) greater than 10 µs;
  xii) greater than 20 µs; and,
  xiii) about 50 µs;
c) having a voltage that is one of:
  i) less than 50V;
  ii) less than 25V;
  iii) less than 10V;
  iv) less than 5V;
  v) less than 2V;
  vi) less than 1V;
  vii) greater than 0.1V;
  viii) greater than 0.2V;
  ix) greater than 0.5V; and,
  x) greater than 1V;
d) having a current that is one of:
  i) less than 50 mA;
  ii) greater than 0.1 mA; and,
  iii) between 0.1 mA and 36 mA;
e) that one of:
  i) are symmetrical;
  ii) are asymmetrical;
  iii) are monophasic;
  iv) are bi-phasic;
  v) are tri-phasic;
  vi) are poly-phasic; and,
  vii) comprise multiple phases with at least one interspersed dwell; and,
f) configured to at least one of:
  i) stimulate activity of the vagus nerve; and,
  ii) inhibit activity of the vagus nerve.

11. The nerve stimulation system according to claim 1, wherein the system comprises a control system having a housing containing at least one of:
a) the signal generator;
b) a power supply; and,
c) the controller.

12. The nerve stimulation system according to claim 1, wherein the system comprises the controller configured to control the signal generator; wherein the controller is configured to:
a) determine therapy signal parameters; and,
b) control the signal generator in accordance with the therapy signal parameters.

13. The nerve stimulation system according to claim 12, wherein the controller is configured to determine the therapy signal parameters based on at least one of:
a) defined therapy signal parameters stored in a memory;
b) user input commands;
c) biofeedback;
d) neurofeedback;
e) signals from a sensor; and,
f) a selected therapy mode.

14. The nerve stimulation system according to claim 12, wherein the system includes a sensor configured to sense at least one subject parameter and wherein the controller is configured to:
a) determine the at least one subject parameter using signals from the sensor; and,
b) cause the signal generator to generate therapy signals in accordance with the at least one subject parameter.

15. The nerve stimulation system according to claim 14, wherein the sensor is at least one of:
a) mounted on a clip proximate the at least one electrode;
b) electrically coupled to at least one of the electrodes;

c) a wearable sensor;
d) on a wearable band; and,
e) on a wearable wrist band;
f) an inflammatory biomarker sensor;
g) a temperature sensor;
h) a blood oxygen sensor;
i) a pulse oximeter;
j) a heart rate sensor; and,
k) an impedance sensor;
wherein the at least one subject parameter includes at least one of:
a) a presence, absence or concentration of an inflammatory biomarker;
b) a temperature;
c) a blood oxygen level;
d) the heart rate;
e) a heart rate variability;
f) an impedance; and,
g) a galvanic skin response.

16. The nerve stimulation system according to claim 14, wherein the controller is configured to:
a) monitor the heart rate of the subject based on signals from the sensor; and,
b) cause the signal generator to generate the therapy signals at least partially in accordance with the heart rate.

17. The nerve stimulation system according to claim 14, wherein the controller is configured to:
a) cause the signal generator to generate the therapy signals;
b) monitor changes in the heart rate of the subject based on signals from the sensor, in response to the applied therapy signals; and,
c) at least one of:
i) cause the signal generator to generate the therapy signals based on monitored the changes in the heart rate; and,
ii) analyse monitored changes in heart rate to determine a heart variability in response to the applied therapy signals.

18. The nerve stimulation system according to claim 12, wherein the controller at least one of:
a) is configured to:
i) determine feedback using user input commands; and,
ii) cause the signal generator to generate the therapy signals in accordance with the feedback;
b) is configured to:
ii) selectone or more therapy signal parameters in response to user input commands; and,
c) comprises at least one of:
a) at least one processing device;
b) a software application executed by a client device; and,
c) an external controller wirelessly connected to at least one of:
i) the signal generator; and,
ii) at least one sensor.

19. The nerve stimulation system according to claim 12, wherein the parameters comprise at least one of:
a) a therapy signal pulse width;
b) a therapy signal magnitude; and,
c) a therapy signal frequency; and,
d) a therapy signal waveform shape;
wherein the controller is configured to progressively increase the therapy signal in steps of one of:
a) 0.1 mA;
b) 0.2 mA;
c) 0.5 mA;
d) 0.8 mA;
e) 1 mA;
f) 1.5 mA; and,
g) 2 mA.

20. The nerve stimulation system according to claim 12, wherein the controller is configured to:
a) determine selection of a therapy mode in accordance with user input commands; and,
b) control the signal generator in accordance with the selected mode;
wherein the system includes a number of therapy modes stored in a store, each therapy mode defining a sequence of therapy signals and wherein the controller is configured to cause the signal generator to generate the sequence of therapy signals.

21. The nerve stimulation system according to claim 12, wherein in a research mode the controller is configured to at least one of:
a) select a therapy signal magnitude in response to user input commands and progressively decrease the therapy signal magnitude to zero; and,
b) deliver non-electrical stimulus.

22. The nerve stimulation system according to claim 12, wherein the system comprises a stimulator configured to apply stimulus to the subject;
wherein the stimulator includes at least one of:
a) an audio stimulator;
b) a vibratory stimulator;
c) an optical stimulator; and,
d) a thermal stimulator.

23. The nerve stimulation system according to claim 1, wherein the nerve stimulation system is configured to at least one of:
a) treat at least one of:
i) depression;
ii) mental health disorders;
iii) autonomic nervous system dysfunction;
iv) stress;
v) heart failure;
vi) traumatic brain injury;
vii) disorders of consciousness;
viii) inflammatory disorders;
ix) autoimmune disorders;
x) cognitive dysfunction;
xi) infections;
xii) symptoms of infections;
xiii) respiratory dysfunction;
xiv) post viral syndrome;
xv) fatigue;
xvi) post traumatic stress disorder;
xvii) cancer;
xviii) fibromyalgia;
xix) postural orthostatic tachycardia syndrome;
xx) myocardial infarction; and,
b) enhance at least one of:
i) physical performance; and,
ii) cognitive function.

24. A vagus nerve stimulation method for stimulating a vagus nerve in a biological subject, the method comprising:
a) attaching a securing member to the subject; and,
b) using a signal generator electrically connected to electrodes to generate at least one therapy signal and applying the therapy signal to the vagus nerve via the securing member electrodes to thereby modulate the vagus nerve of the subject for treating atrial fibrillation;

c) causing the signal generator to generate progressively changing therapy signals having progressively changing therapy signal parameters;
d) monitoring a heart rate of the subject;
e) detecting changes in heart rate whilst the therapy signal parameters change;
f) setting a therapy signal parameter threshold based on one of the therapy signal parameters of the therapy signal when the changes in heart rate are detected; and,
g) causing the signal generator to generate therapy signals based on the therapy signal parameter threshold to thereby modulate the vagus nerve of the subject for treating atrial fibrillation.

* * * * *